US010414954B2

(12) United States Patent
Qie et al.

(10) Patent No.: US 10,414,954 B2
(45) Date of Patent: Sep. 17, 2019

(54) WATER-BASED PRESSURE-SENSITIVE ADHESIVE COMPOSITIONS

(71) Applicant: 3M INNOVATIVE PROPERTIES COMPANY, St. Paul, MN (US)

(72) Inventors: Lili Qie, Woodbury, MN (US); Zhong Chen, Woodbury, MN (US); Zhipeng Song, Chadds Ford, PA (US); John R. Jacobsen, Woodbury, MN (US); Peggy S. Willett, Fort Myers, FL (US); Robert D. Waid, Maplewood, MN (US); Jayshree Seth, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 307 days.

(21) Appl. No.: 15/533,556

(22) PCT Filed: Dec. 14, 2015

(86) PCT No.: PCT/US2015/065541
§ 371 (c)(1),
(2) Date: Jun. 6, 2017

(87) PCT Pub. No.: WO2016/109176
PCT Pub. Date: Jul. 7, 2016

(65) Prior Publication Data
US 2017/0369749 A1 Dec. 28, 2017

Related U.S. Application Data

(60) Provisional application No. 62/097,795, filed on Dec. 30, 2014.

(51) Int. Cl.
*C09J 133/08* (2006.01)
*C08L 33/08* (2006.01)
*C08F 220/06* (2006.01)
*C08F 216/14* (2006.01)
*C08F 220/18* (2006.01)

(52) U.S. Cl.
CPC ............ *C09J 133/08* (2013.01); *C08L 33/08* (2013.01); *C08F 220/06* (2013.01); *C08F 2216/1433* (2013.01); *C08F 2220/1858* (2013.01); *C08F 2220/1875* (2013.01); *C08L 2201/54* (2013.01)

(58) Field of Classification Search
CPC ..... C09J 133/08; C08L 33/08; C08L 2201/54; C08F 220/06; C08F 2216/1433; C08F 2220/1858; C08F 2220/1875
USPC ...................................................... 524/458
See application file for complete search history.

(56) References Cited

U.S. PATENT DOCUMENTS

| | | |
|---|---|---|
| 3,241,662 A | 3/1966 | Robinson |
| 3,324,218 A | 6/1967 | Gebler |
| 3,578,622 A | 5/1971 | Brown |
| 4,912,169 A | 3/1990 | Whitmire |
| 5,032,460 A | 7/1991 | Kantner |
| 5,204,219 A | 4/1993 | Van Ooij |
| 5,492,950 A | 2/1996 | Brown |
| 5,637,646 A | 6/1997 | Ellis |
| 5,686,517 A | 11/1997 | Wells |
| 5,686,518 A | 11/1997 | Fontenot |
| 5,804,610 A | 9/1998 | Hamer |
| 5,986,011 A | 11/1999 | Ellis |
| 6,048,611 A | 4/2000 | Lu |
| 6,451,425 B1 | 9/2002 | Kozulla |
| 6,511,744 B2 | 1/2003 | Centner |
| 6,638,637 B2 | 10/2003 | Hager |
| 6,657,011 B2 | 12/2003 | Lau |
| 6,710,128 B1 | 3/2004 | Helmer |
| 6,783,850 B2 | 8/2004 | Takizawa |
| 8,258,240 B2 | 9/2012 | Suzuki |
| 2002/0082319 A1 | 6/2002 | Zhao |
| 2003/0125459 A1 | 7/2003 | Wulff |
| 2010/0081764 A1 | 4/2010 | Ouzineb |
| 2010/0099317 A1 | 4/2010 | Suzuki |
| 2011/0008605 A1 | 1/2011 | Suzuki |
| 2011/0086219 A1 | 4/2011 | Ikeya |
| 2011/0263787 A1 | 10/2011 | Takahashi |
| 2012/0082816 A1 | 4/2012 | Wada |

(Continued)

FOREIGN PATENT DOCUMENTS

| | | |
|---|---|---|
| EP | 0301827 | 2/1989 |
| EP | 0372756 | 6/1990 |

(Continued)

OTHER PUBLICATIONS

Zhao, "Structured latex particles with improved mechanical properties", Progress in Organic Coatings, 1999, vol. 35, pp. 265-275.

*Primary Examiner* — Kelechi C Egwim
(74) *Attorney, Agent, or Firm* — Jean A. Lown

(57) ABSTRACT

A pressure-sensitive adhesive is provided that is a dried product of a latex composition, which is formed from an emulsion composition. The latex composition and the emulsion composition are also provided. The emulsion composition has droplets that contain various monomers plus a (meth)acrylate polymer and a hydrogenated hydrocarbon tackifier dissolved in the monomers. Additionally, an article containing a layer of the pressure-sensitive adhesive and a method of forming the pressure-sensitive adhesive are provided. The pressure-sensitive adhesives often have both high peel adhesion and high shear strength (i.e., high cohesive strength or high shear holding power).

15 Claims, 1 Drawing Sheet

(56) References Cited

U.S. PATENT DOCUMENTS

| | | |
|---|---|---|
| 2012/0114930 A1 | 5/2012 | Yamamoto |
| 2012/0157593 A1 | 6/2012 | Ootake |
| 2012/0328864 A1 | 12/2012 | Takarada |
| 2013/0005911 A1 | 1/2013 | Okamoto |
| 2013/0059105 A1 | 3/2013 | Wright |
| 2016/0333223 A1 | 11/2016 | Qie |
| 2017/0081566 A1 | 3/2017 | Zhang |

FOREIGN PATENT DOCUMENTS

| | | |
|---|---|---|
| EP | 0554832 | 8/1993 |
| EP | 1911771 | 4/2008 |
| EP | 2803712 | 11/2014 |
| JP | 2003-105298 | 4/2003 |
| JP | 2003105298 A * | 4/2003 |
| JP | 2004-263024 | 9/2004 |
| WO | WO 1993/08239 | 4/1993 |
| WO | WO 1996/07522 | 3/1996 |
| WO | WO 2008/103526 | 8/2008 |
| WO | WO 2011/139593 | 11/2011 |
| WO | WO 2013/032771 | 3/2013 |
| WO | WO 2013/074446 | 5/2013 |
| WO | WO 2014/186169 | 11/2014 |
| WO | WO 2016/109173 | 7/2016 |
| WO | WO 2016/109174 | 7/2016 |

\* cited by examiner

WATER-BASED PRESSURE-SENSITIVE ADHESIVE COMPOSITIONS

CROSS REFERENCE TO RELATED APPLICATIONS

This application is a national stage filing under 35 U.S.C. 371 of PCT/US2015/065541, filed Dec. 14, 2015, which claims the benefit of U.S. Provisional Application No. 62/097,795, filed Dec. 30, 2014, the disclosure of which is incorporated by reference in its/their entirety herein.

TECHNICAL FIELD

A pressure-sensitive adhesive, a latex composition used to form the pressure-sensitive adhesive, and an emulsion composition used to form the latex composition are provided.

BACKGROUND

Pressure-sensitive adhesive (PSA) tapes are virtually ubiquitous in the home and workplace. In one of its simplest configurations, a pressure-sensitive tape includes a backing layer and an adhesive layer attached to the backing layer. According to the Pressure-Sensitive Tape Council, pressure-sensitive adhesives are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., about 20° C. to 25° C.). Materials that are merely sticky or that adhere to a surface do not necessarily constitute a PSA; the term PSA encompasses materials with additional viscoelastic properties.

Acrylic-based pressure-sensitive adhesives have been widely used. These pressure-sensitive adhesive compositions can be prepared with or without an organic solvent. PSA compositions containing organic solvents, while currently dominant in the marketplace, are decreasing in importance due to various issues such as pollution, high energy consumption, and flammability associated with the use of organic solvents. That is, the adhesive industry is increasingly focused on adhesive compositions that have either low or no organic solvent content.

Some such adhesive compositions can, for example, be prepared from water-based latex compositions formed by emulsion polymerization. Such adhesives are described, for example, in U.S. Pat. No. 5,686,518 (Fontenot et al.), U.S. Pat. No. 6,710,128 (Helmer et al.), U.S. Pat. No. 6,511,744 (Centner et al.), U.S. Pat. No. 6,048,611 (Lu et al.), U.S. Pat. No. 4,912,169 (Whitmire et al.), U.S. Pat. No. 6,657,011 (Lau et al.), U.S. Pat. No. 8,258,240 (Suzuki et al.), and U.S. Patent Application Publication No. 2010/0081764 (Ouzineb et al.).

SUMMARY

A pressure-sensitive adhesive is provided that is the dried product of a latex composition, which is formed from an emulsion composition. The latex composition and the emulsion composition are also provided. Additionally, an article containing the pressure-sensitive adhesive and a method of forming the pressure-sensitive adhesive are provided. The pressure-sensitive adhesive often has both high peel strength and high shear strength (i.e., cohesion), and good peel creep properties at both room temperature (e.g., about 20° C. to about 25° C.) and at elevated temperatures (e.g., around about 70° C.).

In a first aspect, an emulsion composition is provided that contains a) water, b) a polymerizable surfactant having an unsaturated group that can undergo free radical polymerization, c) a first monomer composition, d) a second (meth)acrylate polymer, and e) a hydrogenated hydrocarbon tackifier. The first monomer composition includes an alkyl (meth)acrylate having a linear or branched alkyl group with at least six carbon atoms. The second (meth)acrylate polymer is present in an amount of 0.5 to 15 weight percent based on a total weight of monomers in the first monomer composition and has a glass transition temperature greater than or equal to 50° C. The second (meth)acrylate polymer is formed from a second monomer composition containing at least 50 weight percent of a cyclic alkyl (meth)acrylate based on a total weight of monomers in the second monomer composition, wherein the cyclic alkyl group has at least six carbon atoms. The emulsion composition contains a first phase that includes the water and a second phase dispersed as droplets within the first phase. The droplets contain a mixture of i) at least 90 weight percent of the first monomer composition, ii) the second (meth)acrylate polymer, and iii) the hydrogenated hydrocarbon tackifier. The second (meth)acrylate polymer and the hydrogenated hydrocarbon tackifier are not miscible with the first phase and are dissolved in the first monomer composition within the droplets.

In a second aspect, a latex composition is provided that contains a reaction product (i.e., polymerized product) of an emulsion composition, wherein the latex composition contains polymeric latex particles. The emulsion composition is the same as described above.

In a third aspect, a pressure-sensitive adhesive is provided that is a dried product of a latex composition. The latex composition contains a reaction product (i.e., polymerized product) of an emulsion composition, wherein the latex composition contains polymeric latex particles. The emulsion composition is the same as described above.

In a fourth aspect, an article is provided. The article contains a substrate and a first pressure-sensitive adhesive layer positioned adjacent to (and directly or indirectly adhered to) a first major surface of the substrate. The pressure-sensitive adhesive layer is a dried product of a latex composition. The latex composition contains a reaction product (i.e., polymerized product) of an emulsion composition, wherein the latex composition contains polymeric latex particles. The emulsion composition is the same as described above.

In a fifth aspect, a method of forming a pressure-sensitive adhesive is provided. The method includes a) forming an emulsion composition as described above; b) polymerizing the emulsion composition to form a latex composition comprising polymeric latex particles; and c) drying the latex composition to form the pressure-sensitive adhesive.

DETAILED DESCRIPTION

Figure 1:
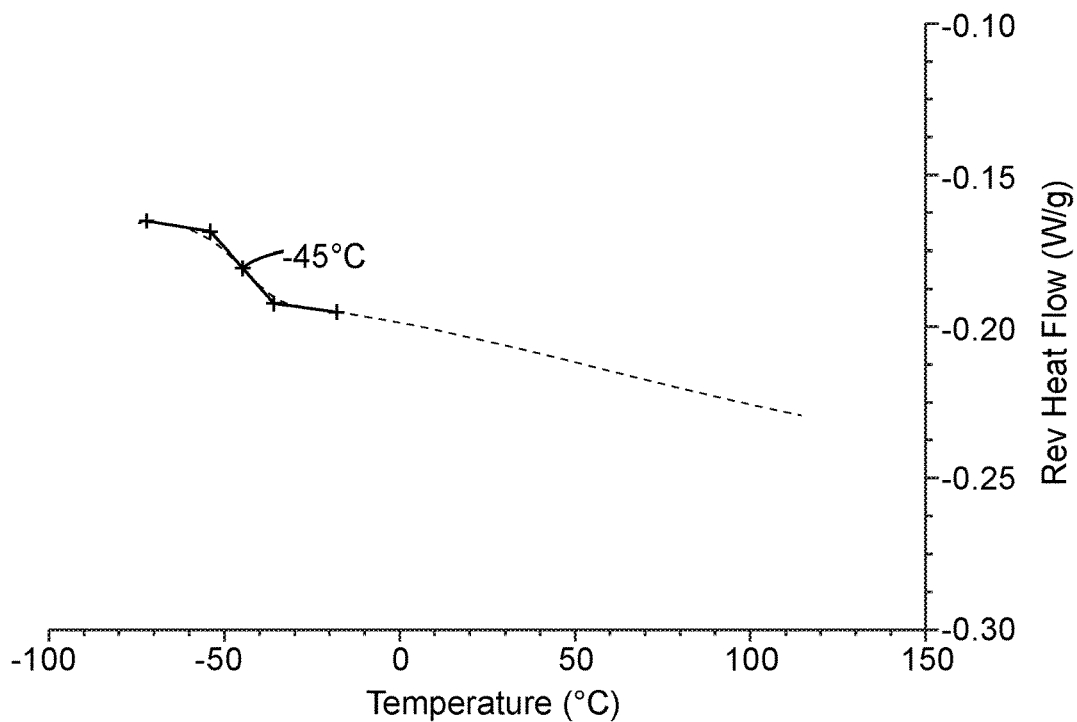
FIG. 1 is the Modulated Differential Scanning Calorimetry plot from the second heating (2H) cycle for the polymeric latex particles of Example 1. Heat flow is plotted as a function of temperature in a nitrogen atmosphere.

A pressure-sensitive adhesive is provided that is a dried product of a latex composition, which is formed from an emulsion composition. The latex composition and the emulsion composition are also provided. The emulsion composition has droplets suspended in a first phase that is mainly water. The droplets contain various monomers, a (meth) acrylate polymer dissolved in the monomers, and a hydrogenated tackifier dissolved in the monomers. The content of the droplets in the emulsion composition are polymerized to form polymeric latex particles in the latex composition. A pressure-sensitive adhesive is provided by drying the latex composition. Additionally, an article containing a layer of the pressure-sensitive adhesive and a method of forming the pressure-sensitive adhesive are provided. The pressure-sensitive adhesives often have both high peel strength, high shear strength (i.e., high cohesive strength or high shear holding power), and high creep peel at both room temperature and at elevated temperatures such as around 70° C.

As used herein, the terms "polymer" and "polymeric" and "polymeric material" are used interchangeably to refer to a homopolymer, copolymer, terpolymer, and the like.

As used herein, the term "(meth)acrylate" refers to both methacrylate and acrylate monomers, polymeric materials derived from these monomers, or both. Likewise, the term "(meth)acrylic" refers to both acrylic and methacrylic materials, the term "(meth)acrylamide" refers to both acrylamide and methacrylamide, and the term "(meth)acrylonitrile" refers to both methacrylonitrile and acrylonitrile.

As used herein, the term "(meth)acrylate polymer" refers to a polymeric material formed from one or more ethylenically unsaturated monomers, wherein greater than 50 weight percent of the monomers have an ethylenically unsaturated group that is a (meth)acryloyl group of formula $H_2C=CR^a-(CO)-$ where $R^a$ is hydrogen or methyl and $-(CO)-$ is a carbonyl group. Some example (meth)acrylate polymers are formed from monomer compositions having greater than 60 weight percent, greater than 70 weight percent, greater than 80 weight percent, greater than 90 weight percent, greater than 95 weight percent, greater than 98 weight percent, or greater than 99 weight percent monomers having a (meth)acryloyl group. The weight percent is based on the total weight of monomers in the monomer composition used to form the (meth)acrylate polymer.

The term "glass transition temperature" or "$T_g$" refers to the temperature at which a material changes from a glassy state to a rubbery state. In this context, the term "glassy" means that the material is hard and brittle (and therefore relatively easy to break) while the term "rubbery" means that the material is elastic and flexible. For polymeric materials, the $T_g$ is the critical temperature that separates their glassy and rubbery behaviors. If a polymeric material is at a temperature below its $T_g$, large-scale molecular motion is severely restricted because the material is essentially frozen. On the other hand, if the polymeric material is at a temperature above its $T_g$, molecular motion on the scale of its repeat unit takes place, allowing it to be soft or rubbery. Any reference herein to the $T_g$ of a monomer refers to the $T_g$ of a homopolymer formed from that monomer. The glass transition temperature of a polymeric material is often determined using methods such as Differential Scanning Calorimetry (e.g., Modulated Differential Scanning Calorimetry). Alternatively, the glass transition of a polymeric material can be calculated using the Fox Equation if the amount and $T_g$ of each monomer used to form the polymeric material are known.

When referring to a range, the endpoints of the range are considered to be in the range. For example, the expressions "in a range from x to y", "in a range of x to y", "in an amount from x to y", "in an amount of x to y", or similar expressions include the endpoints x and y.

As used herein, the term "and/or" such as in the expression A and/or B means A alone, B alone, or both A and B.

The emulsion composition that is used to form the latex composition and, ultimately, the pressure-sensitive adhesive contains a) water, b) a polymerizable surfactant having an unsaturated group that can undergo a free radical polymerization reaction (e.g., an ethylenically unsaturated group), c) a first monomer composition, d) a second (meth)acrylate polymer, and e) a hydrogenated hydrocarbon tackifier. The emulsion has a first phase that includes water and a second phase dispersed as droplets within the first phase. The polymerizable surfactant is typically predominately (e.g., at least 95 weight percent or more, at least 97 weight percent, at least 98 weight percent, at least 99 weight percent, at least 99.5 weight percent, at least 99.8 weight percent, or at least 99.9 weight percent) present in the first phase and/or at the interface between the droplets and the first phase. The second (meth)acrylate polymer is dissolved in the monomers of the first monomer composition (or dissolved in the monomers of the first monomer composition and the hydrogenated hydrocarbon tackifier) within the droplets of the second phase of the emulsion composition. The second (meth)acrylate polymer typically is not miscible with the first phase of the emulsion composition but is miscible with both the first monomer composition and the hydrogenated hydrocarbon tackifier. The second meth)acrylate polymer is formed from a second monomer composition that is different than the first monomer composition contained in the emulsion composition. The hydrogenated tackifier is dissolved in the monomers of the first monomer composition (or dissolved in the monomers of the first monomer composition and the second (meth)acrylate polymer). The hydrogenated hydrocarbon tackifier is not miscible with the first phase of the emulsion composition but is miscible with the second (meth)acrylate polymer and the first monomer composition.

A major component of the emulsion composition is water. The percent solids of the emulsion composition are often up to 70 weight percent or higher such as up to 75 weight percent. If the percent solids are higher, the viscosity of the emulsion may be too high to adequately disperse the droplets. In some embodiments, the percent solids are up to 65 weight percent, up to 60 weight percent, up to 55 weight percent, or up to 50 weight percent. The percent solids are typically at least 10 weight percent. If the solids are lower, the efficiency of preparation of the latex particles may be unacceptably low. In some embodiments, the percent solids are at least 15 weight percent, at least 20 weight percent, at least 25 weight percent, at least 30 weight percent, at least 35 weight percent, at least 40 weight percent, or at least 45 weight percent. In some examples, the percent solids are in a range of 10 to 75 weight percent, 10 to 70 weight percent, 20 to 70 weight percent, 30 to 70 weight percent, 40 to 70 weight percent, or 40 to 60 weight percent. The percent solids are based on the total weight of the emulsion composition.

The portion of the emulsion composition that is not a solid is typically water. Thus, the water content of the emulsion is often at least 25 weight percent or at least 30 weight percent. In some embodiments, the water content can be up to 90 weight percent, up to 85 weight percent, up to 80 weight percent, up to 75 weight percent, up to 70 weight percent, up to 65 weight percent, up to 60 weight percent, or up to 55 weight percent. The water content can be at least 35 weight percent, at least 40 weight percent, at least 45 weight percent, or at least 50 weight percent. In some examples, the water content is in a range of 25 to 90 weight percent, 30 to 90 weight percent, 30 to 80 weight percent, 30 to 70 weight percent, 30 to 60 weight percent, or 40 to 60 weight percent. The amount of water is based on the total weight of the emulsion composition.

Some of the water can be replaced with a polar organic solvent that is miscible with water such as a polar solvent. If present, no more than 20 weight percent, no more than 15 weight percent, no more than 10 weight percent, or no more than 5 weight percent of the first phase is the water-miscible, polar organic solvent. The polar solvent is often an alcohol such as an alcohol having 1 to 10 carbon atoms, 1 to 6 carbon atoms, or 1 to 4 carbon atoms. In many embodiments, no water-miscible, polar organic solvent is purposefully added to the emulsion composition but may be present as a contaminant or diluent in one of the other components.

The emulsion composition contains a polymerizable surfactant. As used herein, the term "polymerizable surfactant" refers to a surfactant with a polymerizable group, which is an unsaturated group that can undergo a free radical polymerization reaction. In the emulsion composition, the polymerizable surfactant is typically in the first phase and/or at the interface between first phase and the droplets that are suspended in the first phase. The polymerizable surfactant facilitates the formation of a latex composition having good stability (e.g., the polymeric latex particles remain suspended and do not coalesce). The polymerizable surfactant may become part of the polymeric latex particles during the polymerization reaction of the emulsion composition.

Using a polymerizable surfactant rather than a surfactant without a polymerizable group tends to improve the peel strength and the shear strength of the resulting pressure-sensitive adhesive. Under high humidity conditions, a surfactant without a polymerizable group tends to migrate to the surface of a pressure-sensitive adhesive. The presence of the surfactant on the surface of the pressure-sensitive adhesive can decrease the adhesive properties of the pressure-sensitive adhesive. In contrast, the polymerizable surfactant can polymerize with the monomers in the first monomer composition and become part of the polymeric latex particles. Polymerization into the polymeric latex particle tends to restrict the mobility of the surfactant.

Example polymerizable surfactants include propenyl polyoxyethylene alkylphenyl compounds such as those commercially available from Montello, Inc. (Tulsa, Okla., USA) under the trade designation NOIGEN RN (e.g., RN-10, RN-20, RN-30, RN-40, and RN-5065), which have a structure shown below where n is at least 2 and where x is an integer such as one close to or equal to 9.

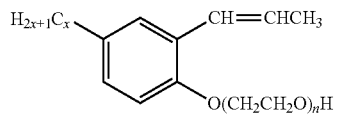

Other example polymerizable surfactants include propenyl polyoxyethylene alkylphenyl ether ammonium sulfate compounds such as those commercially available from Montello, Inc. under the trade designation HITENOL BC (e.g., BC-10, BC-1025, BC-20, BC-2020, and BC-30), which have a structure shown below where n is at least 2 and where x is an integer such as one close to or equal to 9.

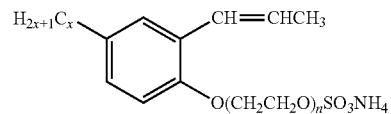

Another example polymerizable surfactant is sodium dodecylallyl sulfosuccinate, $CH_3-(CH_2)_{11}-O-(CO)-CH_2-CH(SO_3Na)-(CO)-O-CH_2-CH=CH_2$, which may be commercially available under the trade designation TREM LF40 from Cognis Corporation (North Rhine-Westphalia, Germany). Yet other examples of polymerizable surfactants are phosphate esters such as those commercially available from Croda (Edison, N.Y., USA) under the trade designation MAXENUL (e.g., MAXEMUL 6106 and 6112).

The polymerizable surfactant is typically used in an amount up to about 2 weight percent, up to 1.8 weight percent, or up to 1.5 weight percent. The amount of the polymerizable surfactant is usually at least 0.5 weight percent, at least 0.7 weight percent, or at least 1 weight percent. The weight percents are based on the total weight of monomers in the first monomer composition.

The emulsion composition contains a first monomer composition. The first monomer composition is typically selected such that the polymerized product of the first monomer composition, which is referred to as the "first (meth)acrylate polymer", has a glass transition temperature no greater than 20° C., no greater than 10° C., no greater than 0° C., no greater than −10° C., or no greater than −20° C.

The first monomer composition in the emulsion composition typically includes an alkyl (meth)acrylate having a linear or branched alkyl group with at least six carbon atoms. In many embodiments, other optional monomers can be included provided that the polymerized product has a sufficiently low glass transition temperature. The amount and type of any optional monomers are selected so that at least 90 weight percent of the monomers within the first monomer composition are within droplets dispersed in the first phase of the emulsion composition. The alkyl (meth)acrylate monomer having a linear or branched alkyl group with at least six carbon atoms is likely to have a low solubility in the first phase and is likely to be predominately (e.g., at least 95 weight percent or more, at least 97 weight percent, at least 98 weight percent, at least 99 weight percent, at least 99.5 weight percent, at least 99.8 weight percent, or at least 99.9 weight percent) in the droplets, which are dispersed in the first phase. If optional polar monomers or other optional monomers are included in the first monomer composition that are less hydrophobic that the alkyl (meth)acrylate monomer having a linear or branched alkyl group with at least six carbon atoms, the solubility of these optional monomers may be greater in water (e.g., in the first phase) compared to the alkyl (meth)acrylate monomer having a linear or branched alkyl group with at least six carbon atoms. As polymerization occurs within the droplet, some of these optional monomers in the first phase may diffuse into the droplet and become part of polymeric latex particles that are formed.

The alkyl (meth)acrylate in the first monomer composition has a linear or branched alkyl group with at least six carbon atoms. Alkyl (meth)acrylate monomers with an alkyl group having less than six carbon atoms are less hydrophobic and are less likely to reside predominately within the droplets. In some embodiments, the alkyl group can have at least 8 carbon atoms, at least 10 carbon atoms, or at least 12 carbon atoms. The alkyl group of the alkyl (meth)acrylate can have up to 28 carbon atoms or more, up to 24 carbon atoms, up to 20 carbon atoms, or up to 18 carbon atoms. In many embodiments, particularly when the number of carbon atoms is greater than 12, the alkyl group is branched. Some alkyl (meth)acrylates having an alkyl group greater than 12 carbon atoms can crystallize if the alkyl group is linear. Crystallization of the alkyl (meth)acrylate is not desirable in the emulsion composition.

Example alkyl (meth)acrylate monomers having a linear or branched alkyl group with at least six carbon atoms for use in the first monomer composition include, but are not limited to, n-hexyl acrylate, 4-methyl-2-pentyl acrylate, 3-methylpentyl acrylate, 2-ethylbutyl acrylate, 2-ethylhexyl acrylate, 2-methylhexyl acrylate, n-octyl acrylate, isooctyl acrylate, 2-octyl acrylate, isononyl acrylate, isoamyl acrylate, n-decyl acrylate, isodecyl acrylate, 2-propylheptyl acrylate, isotridecyl acrylate, isostearyl acrylate, 2-octyldecyl acrylate, lauryl acrylate, heptadecanyl acrylate, n-hexyl methacrylate, isodecyl methacrylate, 2-ethylhexyl methacrylate, isooctyl methacrylate, and lauryl methacrylate.

Still others alkyl (meth)acrylates having a linear or branched alkyl group with at least six carbon atoms for use in the first monomer composition are of Formula (I).

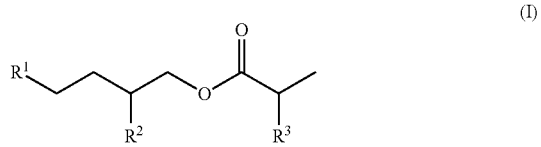

(I)

In Formula (I), group $R^3$ is hydrogen or methyl and groups $R^1$ and $R^2$ are each independently a linear or branched alkyl group having 4 to 14 carbon atoms. These monomers are often formed from a Guerbet alcohol, which is a 2-alkyl alkanol. Example monomers of Formula (I) include 2-butyloctyl acrylate, 2-butyldecyl acrylate, 2-hexyloctyl acrylate, 2-hexyldecyl acrylate, 2-tetradecyloctadecyl acrylate, 2-dodecylhexadecyl acrylate, 2-decyltetradecyl acrylate, 2-octyldodecyl acrylate, 2-hexyldecyl acrylate, 2-octyldecyl acrylate, 2-hexyldodecyl acrylate, and 2-octyldodecyl acrylate.

The first monomer composition typically contains at least 50 weight percent alkyl (meth)acrylate having a linear or branched alkyl group with at least six carbon atoms. The first monomer composition often contains at least 60 weight percent, at least 70 weight percent, or at least 80 weight percent of the alkyl (meth)acrylate having a linear or branched alkyl group with at least six carbon atoms. The amount of the alkyl (meth)acrylate having an alkyl group with at least six carbon atoms can be up to 100 weight percent. The first monomer composition often contains up to 95 weight percent, up to 90 weight percent, or up to 85 weight percent of the alkyl (meth)acrylate having a linear or branched alkyl group with at least six carbon atoms. In some embodiments, the amount of the alkyl (meth)acrylate is in a range of 50 to 100 weight percent, in a range of 50 to 95 weight percent, in a range of 60 to 95 weight percent, in a range of 70 to 95 weight percent, or in a range of 75 to 90 weight percent. The amount of the alkyl (meth)acrylate is based on a total weight of monomers in the first monomer composition.

In many embodiments, the alkyl (meth)acrylate having a linear or branched alkyl group with at least six carbon atoms is combined with an optional cyclic alkyl (meth)acrylate within the first monomer composition. As used herein, the term "cyclic alkyl" refers to a mono-cyclic alkyl, a bicyclic alkyl, or a tricyclic alkyl group. Examples of cyclic alkyl (meth)acrylate monomers include, but are not limited to, isobornyl (meth)acrylate, 3,3,5-trimethylcyclohexyl (meth)acrylate, cyclohexyl (meth)acrylate, adamantyl (meth)acrylate 3,5-dimethyladamantyl (meth)acrylate, and 4-tert-butyl-cylcohexyl (meth)acrylate.

Some of these cyclic alkyl (meth)acrylates have a high glass transition temperature (such as at least 80° C.) and must be used in sufficiently low amounts so that the polymerized product of the first monomer composition has a glass transition temperature no greater than 20° C. The presence of the cyclic alkyl (meth)acrylate can enhance the solubility of the second (meth)acrylate polymer within the first monomer composition. In many embodiments that contain the optional cyclic alkyl (meth)acrylate, the first monomer composition contains at least 0.5 weight percent, at least 1 weight percent, at least 2 weight percent, at least 5 weight percent, or at least 10 weight percent of the cyclic alkyl (meth)acrylate. The amount of the cyclic alkyl (meth)acrylate can be up to 30 weight percent, up to 25 weight percent, up to 20 weight percent, or up to 15 weight percent. For example, the amount of the cyclic alkyl (meth)acrylate in the first monomer composition can be in a range of 0 to 30 weight percent, 1 to 30 weight percent, 0 to 20 weight percent, 1 to 20 weight percent, or 5 to 20 weight percent. The weight percent of the cyclic alkyl (meth)acrylate is based on a total weight of monomers in the first monomer composition.

The first monomer composition optionally can include a polar monomer such as an optional acid-containing monomer (i.e., a monomer with an acidic group) or an optional hydroxyl-containing monomer (i.e., a monomer with a hydroxyl group). These optional monomers can be added to increase the cohesive strength of the final polymeric material. Suitable optional acid-containing monomers include, but are not limited to, (meth)acrylic acid, itaconic acid, maleic acid, 2-carboxyethyl acrylate, crotonic acid, citraconic acid, maleic acid, maleic anhydride (which hydrolyzes to have two carboxylic acid groups), oleic acid, and mono-2-acryloyloxyethyl succinate. Suitable optional hydroxyl-containing monomers include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), or hydroxyalkyl (meth)acrylamides (e.g., 2-hydroxyethyl (meth)acrylamide or 3-hydroxypropyl (meth)acrylamide). In many embodiments, the polar monomer is an acidic monomer. In many embodiments, the optional polar monomer has a (meth)acryloyl group. The first monomer composition typically contains 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent of the optional polar monomer. The total amount used is selected so that at least 90 weight percent of the overall first monomer composition is within the droplets of the second phase. The weight percent is based on the total weight of monomers within the first monomer composition.

The first monomer composition optionally can contain up to 20 weight percent alkyl (meth)acrylate having an alkyl group with one to five carbon atoms. The alkyl group can be linear or branched. If larger amounts of an alkyl (meth) acrylate having an alkyl group with one to five carbon atoms are used, too much of the overall first monomer composition may be in the first phase rather than in the droplets. In many embodiments, the amount of alkyl (meth)acrylate having an alkyl group with one to five carbon atoms is present in an amount no greater than 15 weight percent, no greater than 10 weight percent, or no greater than 5 weight percent. In some embodiments, there is no alkyl (meth)acrylate having an alkyl group with one to five carbon atoms. In other embodiments, the first monomer composition can contain at least 0.5 weight percent, at least 1 weight percent, at least 2 weight percent, or at least 5 weight percent of the alkyl (meth)acrylate having an alkyl group with one to five carbon atoms. The amount of the alkyl (meth)acrylate with an alkyl group having one to five carbon atoms is usually in a range of 0 to 20 weight percent, 1 to 20 weight percent, 5 to 20 weight percent, 10 to 20 weight percent, 0 to 15 weight percent, 1 to 15 weight percent, 5 to 15 weigh percent, 0 to 10 weight percent, 1 to 10 weight percent, 0 to 5 weight percent, or 1 to 5 weight percent. The amount of the alkyl (meth)acrylate is based on a total weight of monomers in the first monomer composition.

The first monomer composition can contain 50 to 100 weight percent of the alkyl (meth)acrylate having a linear or branched alkyl group with at least six carbon atoms, 0 to 30 weight percent of a cyclic alkyl (meth)acrylate, 0 to 20 weight percent of the alkyl (meth)acrylate having an alkyl group with one to five carbon atoms, and 0 to 15 weight percent of a polar monomer. In some examples, the first monomer composition contains 60 to 98 weight percent of the alkyl (meth)acrylate having a linear or branched alkyl group with at least six carbon atoms, 1 to 25 weight percent of a cyclic alkyl (meth)acrylate, 0 to 15 weight percent of the alkyl (meth)acrylate having an alkyl group with one to five carbon atoms, and 1 to 15 weight percent of the polar monomer. In some examples, the first monomer composition contains 70 to 98 weight percent of the alkyl (meth)acrylate having a linear or branched alkyl group with at least six carbon atoms, 1 to 20 weight percent of a cyclic alkyl (meth)acrylate, 0 to 10 weight percent of the alkyl (meth) acrylate having an alkyl group with one to five carbon atoms, and 1 to 10 weight percent of the polar monomer.

In other examples, the first monomer composition contains 60 to 98 weight percent of the alkyl (meth)acrylate having a linear or branched alkyl group with at least six carbon atoms, 1 to 30 weight percent of a cyclic alkyl (meth)acrylate, and 1 to 10 weight percent of the polar monomer. For example, the first monomer composition contains 70 to 98 weight percent of the alkyl (meth)acrylate having a linear or branched alkyl group with at least six carbon atoms, 1 to 20 weight percent of a cyclic (meth) acrylate, and 1 to 10 weight percent of the polar monomer such as a (meth)acrylic acid.

The emulsion composition has droplets dispersed in the first phase. Prior to polymerization of the emulsion composition to form a latex composition, the droplets contain a solution of the second (meth)acrylate polymer dissolved in the components of the first monomer composition that are in the droplets. Typically, at least 90 weight percent of the monomers in the first monomer composition are within the droplets of the emulsion and no more than 10 weight percent of the monomers of the first composition are within the first phase of the emulsion composition. Polar monomers or other monomers that are less hydrophobic than the alkyl (meth)acrylate having a linear or branched alkyl group with at least six carbon atoms may be distributed within both the droplets and the first phase. As polymerization proceeds, any of these polar monomers or less hydrophobic monomers in the first phase may diffuse into the droplets and become part of the polymeric latex particles. In some embodiments, at least 92 weight percent, at least 95 weight percent, at least 98 weight percent, or at least 99 weight percent of the monomers in the first monomer composition are in the droplets of the emulsion composition.

The second (meth)acrylate polymer is selected so that it can be dissolved in the first monomer composition (or dissolved in the first monomer composition and the hydrogenated hydrocarbon tackifier) within the droplets of the emulsion composition. The second (meth)acrylate polymer is miscible with the first monomer composition and the hydrogenated hydrocarbon tackifier but not with the first phase. The second (meth)acrylate polymer is formed prior to dissolution by the components of the first monomer composition (or prior to dissolution by the components of the first monomer composition and the hydrogenated hydrocarbon tackifier) within the droplets. The second (meth)acrylate polymer facilitates the formation of stable droplets within the first phase of the emulsion composition.

The second (meth)acrylate polymer is typically formed from a second monomer composition. The second monomer composition is selected to provide a second (meth)acrylate polymer that can be dissolved in the first monomer composition (or dissolved in the first monomer composition and the hydrogenated hydrocarbon tackifier). The second monomer composition is not identical to the first monomer composition. Additionally, it is often desirable that the second (meth)acrylate polymer be distributed fairly uniformly throughout the droplets within the emulsion composition. That is, it is often desirable that the second (meth)acrylate polymer and the polymeric material formed by polymerization of the first monomer composition (i.e., the first (meth) acrylate polymer) are both fairly uniformly distributed throughout the resulting polymeric latex particles even though their compositions are not identical. The first (meth) acrylate polymer, the second (meth)acrylate polymer, and the hydrogenated hydrocarbon tackifier are all within the same latex particles.

The second monomer composition is selected to provide a second (meth)acrylate polymer that has a glass transition temperature that is at least 50° C. as measured using Differential Scanning Calorimetry (e.g., Modulated Differential Calorimetry). For example, the glass transition temperature is at least 60° C., at least 70° C., at least 80° C., at least 90° C., or at least 100° C. The glass transition temperature can be up to 250° C., up to 200° C., or up to 175° C. Often, the glass transition temperature is no greater than 150° C., no greater than 140° C., no greater than 130° C., or no greater than 120° C.

The second monomer composition usually includes at least 50 weight percent of a cyclic alkyl (meth)acrylate based on a total weight of monomers in the second monomer composition, wherein the cyclic group has at least six carbon atoms. For example, the cyclic group can have up to 12 carbon atoms, up to 10 carbon atoms, or up to 8 carbon atoms. Examples of cyclic alkyl (meth)acrylate monomers include, but are not limited to, isobornyl (meth)acrylate, 3,3,5-trimethylcyclohexyl (meth)acrylate, cyclohexyl (meth)acrylate, adamantyl (meth)acrylate, 3,5-dimethyladamantyl (meth)acrylate, and 4-tert-butylcylcohexyl (meth) acrylate.

In many embodiments, the cyclic alkyl (meth)acrylate has a glass transition temperature that is at least 80° C. when polymerized as a homopolymer. Suitable monomers include, but are not limited to, isobornyl (meth)acrylate, 3,3,5-trimethylcyclohexyl methacrylate, cyclohexyl methacrylate, 3,5-dimethyladamantyl acrylate, and 4-tert-butylcylcohexyl methacrylate.

The cyclic alkyl (meth)acrylate can be the only monomer in the second monomer composition or it can be combined with other optional monomers provided that 1) the resulting second (meth)acrylate polymer has a glass transition temperature equal to at least 50° C. as measured using Differential Scanning Calorimetry (e.g., Modulated Differential Scanning Calorimetry) or, 2) the resulting second (meth) acrylate polymer can be dissolved in the first monomer composition (or dissolved in the first monomer composition and the hydrogenated hydrocarbon tackifier), and 3) the second (meth)acrylate polymer remains within the droplets of the emulsion composition and is not miscible with the first phase of the emulsion composition. These optional monomers include, for example, a polar monomer, an alkyl (meth)acrylate having a linear or branched alkyl group, (meth)acrylamide, a (meth)acrylonitrile, an N-alkyl (meth) acrylamide, an N,N-dialkyl (meth)acrylamide, and a vinyl monomer that does not have a (meth)acryloyl group.

The second monomer composition can optionally include a polar monomer such as an optional acid-containing monomer (i.e., a monomer with an acidic group) or an optional hydroxyl-containing monomer (i.e., a monomer with a hydroxyl group). Suitable optional acid-containing monomers include, but are not limited to, (meth)acrylic acid, itaconic acid, maleic acid, 2-carboxyethyl acrylate, crotonic acid, citraconic acid, maleic acid, maleic anhydride (which hydrolyzes to have two carboxylic acid groups), oleic acid, and mono-2-acryloyloxyethyl succinate. Suitable optional hydroxyl-containing monomers include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth) acrylate), or hydroxyalkyl (meth)acrylamides (e.g., 2-hydroxyethyl (meth)acrylamide or 3-hydroxypropyl (meth) acrylamide). In many embodiments, the optional polar monomer has a (meth)acryloyl group. In many embodiments, the polar monomer is a (meth)acrylic acid. The second monomer composition typically contains 0 to 10 weight percent, 1 to 10 weight percent, 0 to 5 weight percent, or 1 to 5 weight percent of the optional acid-containing monomer and/or optional hydroxyl-containing monomer. The weight percents are based on the total weight of monomers within the second monomer composition.

The second monomer composition can optionally include an alkyl (meth)acrylate having a linear or branched alkyl group. Example monomers include methyl (meth)acrylate, ethyl (meth)acrylate, isopropyl (meth)acrylate, isobutyl (meth)acrylate, n-butyl (meth)acrylate, tert-butyl (meth) acrylate, n-pentyl (meth)acrylate, isopentyl (meth)acrylate, 2-methylbutyl (meth)acrylate, n-hexyl (meth)acrylate, 4-methyl-2-pentyl (meth)acrylate, 2-methylhexyl (meth) acrylate, 2-ethylhexyl (meth)acrylate, isooctyl (meth)acrylate, n-octyl (meth)acrylate, 2-octyl (meth)acrylate, isononyl (meth)acrylate, isoamyl (meth)acrylate, n-decyl (meth)acrylate, isodecyl (meth)acrylate, 2-propylheptyl (meth)acrylate, isotridecyl (meth)acrylate, and lauryl (meth)acrylate. The amount of the alkyl methacrylate is often limited by the desired glass transition temperature of the second (meth) acrylate polymer.

Other suitable optional monomers for use in second monomer composition include (meth)acrylamide, (meth) acrylonitrile, an N-alkyl (meth)acrylamide having an alkyl group with 1 to 10 carbon atoms (e.g., 2 to 10 carbon atoms or 4 to 10 carbon atoms) such as N-octyl acrylamide, N-isopropyl acrylamide, or N-tert-butyl acrylamide, or an N,N-dialkyl (meth)acrylamide having alkyl groups with 1 to 10 carbon atoms (e.g., 1 to 6 carbon atoms or 1 to 4 carbon atoms) such as N,N-dimethyl acrylamide.

Still other optional monomers can be included in the second monomer composition provided that there is suitable compatibility between the resulting second (meth)acrylate polymer and first monomer composition within the emulsion composition and provided that the second (meth)acrylate polymer can be dissolved within the droplets of the emulsion composition. Examples of other optional monomers include various vinyl monomers, wherein the vinyl group is not a (meth)acryloyl group. Optional vinyl monomers include, for example, vinyl esters such as vinyl butyrate, and various vinyl non-aromatic heterocyclic monomers such as N-vinyl pyrollidone and N-vinyl caprolactam.

A crosslinking monomer typically is not included in the second monomer composition. A crosslinked (meth)acrylate polymer would be difficult to dissolve in the first monomer composition. In many embodiments, the second monomer composition does not contain an aromatic monomer (i.e., a monomer with an aromatic group such as a styrenic monomer or aryl (meth)acrylate).

In many embodiments, the second monomer composition includes 50 to 100 weight percent of a cyclic alkyl (meth) acrylate and 0 to 50 weight percent optional monomers such as those selected from a polar monomer, an alkyl (meth) acrylate having a linear or branched alkyl group, and a vinyl monomer that does not have a (meth)acryloyl group, (meth) acrylamide, (meth)acrylonitrile, N-alkyl (meth)acrylamide, N,N-dialkyl (meth)acrylamide, and a mixture thereof. For example, the second monomer composition can include 60 to 100 weight percent of the cyclic alkyl (meth)acrylate and 0 to 40 percent optional monomers, 70 to 100 weight percent of the cyclic alkyl (meth)acrylate and 0 to 30 percent optional monomers, 80 to 100 weight percent of the cyclic alkyl (meth)acrylate and 0 to 20 percent optional monomers, 90 to 100 weight percent of the cyclic alkyl (meth)acrylate and 0 to 10 percent optional monomers, 90 to 99 weight percent of the cyclic alkyl (meth)acrylate and 1 to 10 percent optional monomers, 95 to 100 weight percent of the cyclic alkyl (meth)acrylate and 0 to 5 percent optional monomers, or 95 to 99 weight percent of the cyclic alkyl (meth)acrylate and 1 to 5 percent optional monomers. The weight percent values are based on the total weight of monomers within the second monomer composition.

In some more specific embodiments, the second monomer composition contains 1) 50 to 100 weight percent of the cyclic alkyl (meth)acrylate, 2) 0 to 50 weight percent of a second monomer selected from an alkyl (meth)acrylate having a linear or branched alkyl group, and a vinyl monomer that does not have a (meth)acryloyl group, (meth) acrylamide, (meth)acrylonitrile, N-alkyl (meth)acrylamide, and N,N-dialkyl (meth)acrylamide, and 3) 0 to 10 weight percent of a polar monomer. For example, the second monomer composition contains 1) 50 to 99 weight percent of the cyclic alkyl (meth)acrylate, 2) 0 to 50 weight percent of the second monomer, and 3) 1 to 10 weight percent of a polar monomer; or 1) 50 to 99 weight percent of the cyclic alkyl (meth)acrylate, 2) 0 to 40 weight percent of the second monomer, and 3) 1 to 10 weight percent of a polar monomer; or 1) 70 to 99 weight percent of the cyclic alkyl (meth)

acrylate, 2) 0 to 20 weight percent of the second monomer, and 3) 1 to 10 weight percent of a polar monomer.

In some particular embodiments, the second monomer composition contains 90 to 99 weight percent of the cyclic alkyl (meth)acrylate and 1 to 10 weight percent polar monomer, 95 to 100 weight percent of the cyclic alkyl (meth)acrylate and 0 to 5 weight percent polar monomer, or 95 to 99 weight percent of the cyclic alkyl (meth)acrylate and 1 to 5 weight percent polar monomer. The weight percent values are based on the total weight of monomers within the second monomer composition. In many embodiments, the polar monomer is an acid-containing monomer such as, for example, a (meth)acrylic acid.

In addition to the second monomer composition, the polymerizable composition used to form the second (meth) acrylate polymer often contains a chain transfer agent. The chain transfer agent is used to control the molecular weight of the second (meth)acrylate polymer. Examples of useful chain transfer agents include, but are not limited to, carbon tetrabromide, alcohols (e.g., ethanol and isopropanol), thiols (e.g., lauryl mercaptan, butyl mercaptan, ethanethiol, 1-dodecanethiol, isooctylthioglycolate, 2-ethylhexyl thioglycolate, 2-ethylhexyl mercaptopropionate, ethyleneglycol bis-thioglycolate), and mixtures thereof. In many embodiments, the preferred chain transfer agent is iso-octyl thioglycolate (IOTG), carbon tetrabromide, or tert-dodecylmercaptan (TDDM). The amount of the optional chain transfer agent is often in a range of 0 to 5 weight percent based on the total weight of monomers in the second monomer composition. If present, the chain transfer agent is often used in an amount of at least 0.01 weight percent, at least 0.02 weight percent, at least 0.05 weight percent, or at least 0.1 weight percent. The amount can be up to 5 weight percent, up to 3 weight percent, up to 2 weight percent, up to 1 weight percent, or up to 0.5 weight percent.

Other optional components can be added along with the second monomer composition to the polymerizable composition used to form the high second (meth)acrylate polymer. For example, the polymerizable composition can include an inhibitor and/or antioxidant. Suitable inhibitors and/or antioxidants include, but are not limited to, mono-methyl ether of hydroquinone (MEQH) and pentaerythritol tetrakis (3-(3, 5-di-tert-butyl-4-hydroxyphenyl) propionate), which is commercially available from BASF (Florham Park, N.J., USA) under the trade designation IRGANOX 1010.

The polymerizable composition used to form the second (meth)acrylate polymer typically includes a free radical initiator to commence polymerization of the monomers. The free radical initiator can be a photoinitator or a thermal initiator. The free radical initiator is typically present in an amount up to 5 weight percent based on the total weight of the monomers in the second monomer composition. In some embodiments, the amount of free radical initiator is up to 4 weight percent, up to 3 weight percent, up to 2 weight percent, or up to 1 weight percent. The amount of free radical initiator included in the polymerizable composition is typically at least 0.005 weight percent. For example, the polymerizable composition often contains at least 0.01 weight percent, at least 0.02 weight percent, at least 0.05 weight percent, at least 0.1 weight percent, at least 0.2 weight percent, or at least 0.5 weight percent free radical initiator.

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is (2,2'-azobis(2,4-dimethylpentanenitrile)), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa., USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In some embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(2,4, 6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

Additionally, an organic solvent can be added, if desired, to control the viscosity of the polymerizable composition used to form the second (meth)acrylate polymer. The amount of organic solvent, if any, is typically determined by the polymerization method. In some solvent-based polymerization methods, the polymerizable composition can contain up to 70 weight percent organic solvent. For adiabatic polymerization methods, however, the amount of organic solvent is typically no greater than 10 weight percent, no greater than 8 weight percent, no greater than 5 weight percent, no greater than 3 weight percent, or no greater than 1 weight percent of the polymerizable composition. Any organic solvent used in the polymerizable composition is typically removed at the completion of the polymerization reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof. In many embodiments (such in some adiabatic polymerization processes), the polymerization occurs with little or no organic solvent present.

The monomers used to form the second (meth)acrylate polymer can be polymerized using any suitable method such as, for example, solution (i.e., with a solvent) polymerization, dispersion polymerization, suspension polymerization, and solventless polymerization (for example, bulk polymerization with either UV or thermal initiator). The polymerization can occur in a single step or in multiple steps. That is, all or a portion of the polymerizable composition may be charged into a suitable reaction vessel and polymerized. If multiple steps are used, an initial charge of monomers and initiator are added to the reactor. After polymerization of the initial charge, another portion of any remaining monomers and/or initiator are added. Multiple polymerization steps can help narrow the polydispersity of the polymerized product (e.g., the amount of low molecular weight chains can be reduced), can help minimize or control the heat of reaction, and can allow for adjustment of the type and amount of monomer available during polymerization.

In many embodiments, the second (meth)acrylate polymer is not formed using emulsion or dispersion polymerization methods. Rather, the second (meth)acrylate polymer is prepared using a solventless bulk polymerization method or a solution polymerization method. Either a thermal initiator or a photoinitiator can be used. In some embodiments, polymerization occurs using an adiabatic process as described, for example, in U.S. Pat. No. 5,986,011 (Ellis et al.) and U.S. Pat. No. 5,637,646 (Ellis). A thermal initiator is used with this process.

The weight average molecular weight of the second (meth)acrylate polymer is typically at least 3,000 grams/mole. If the weight average molecular weight is lower, the resulting pressure-sensitive adhesive may have an unacceptably low cohesive strength. The second (meth)acrylate polymer often has a weight average molecular weight of at least 5,000 grams/mole, at least 10,000 grams/mole. If the weight average molecular weight is at least 10,000 grams/mole, the resulting pressure-sensitive adhesives may having improved shear strength and peel creep (especially at elevated temperatures such as 70° C.) when adhered to a low energy substrate. In some embodiments, the weight average molecular weight is at least 12,000 grams/mole, at least 15,000 grams/mole, or at least 20,000 grams/mole. The weight average molecular weight can be up to 150,000 grams/mole. If the molecular weight is higher, the second (meth)acrylate polymer might not dissolve in the first monomer composition of the emulsion composition. If not dissolved in the first monomer composition (or if not dissolved in the first monomer composition and the hydrogenated hydrocarbon tackifier), the second (meth)acrylate polymer can undesirably be present in separate droplets from the first monomer composition within the emulsion composition and/or can phase separate during polymerization. The weight average molecular weight is often up to 120,000 grams/mole, up to 100,000 grams/mole, up to 80,000 grams/mole, up to 60,000 grams/mole, or up to 50,000 grams/mole. For example, the weight average molecular weight can be in a range of 3,000 to 150,000 grams/mole, in the range of 10,000 to 150,000 grams/mole, in a range of 3,000 to 100,000 grams/mole, in the range of 10,000 to 100,000 grams/mole, in a range of 3,000 to 50,000 grams/mole, or in the range of 10,000 to 50,000 grams/mole.

The second (meth)acrylate polymer is added to the emulsion composition. That is, this polymeric material is prepared prior to combination with the other components of the emulsion composition. The second (meth)acrylate polymer typically does not undergo further free radical polymerization within the emulsion composition or with other components of the emulsion composition. The second (meth)acrylate can, however, undergo a crosslinking reaction within the emulsion composition.

The second (meth)acrylate polymer is usually added to the emulsion composition after being dissolved in the first monomer composition or in both the first monomer composition and the hydrogenated hydrocarbon tackifier. A solution of the second (meth)acrylate polymer, the first monomer composition, and the hydrogenated hydrocarbon tackifier are added together into the first phase of the emulsion. The solution is typically added under conditions of high shear mixing to form droplets suspended within the first phase. In some embodiments, the second (meth)acrylate polymer is initially dissolved in a portion of the first monomer composition and then the resulting polymer solution is mixed with the remaining monomers of the first monomer composition and with the hydrogenated hydrocarbon tackifier.

The amount of second (meth)acrylate polymer added to the emulsion composition is typically at least 0.5 weight percent or at least 1 weight percent. If a lower amount of the second (meth)acrylate polymer is added, the stability of the emulsion composition may be poor. That is, it can be difficult to form and maintain droplets in the emulsion composition. In some embodiments, the emulsion composition contains at least 2 weight percent, at least 3 weight percent, or at least 5 weight percent of the second (meth)acrylate polymer. The amount of the second (meth)acrylate polymer added is typically up to 15 weight percent. If a higher amount of the second (meth)acrylate polymer is added, the polymerization of the first monomer composition within the droplets may be undesirably slow. Additionally, the polymeric material formed from the first monomer composition may have an undesirably low molecular weight and the resulting pressure-sensitive adhesive may have an undesirably low cohesive strength. In some embodiments, the emulsion composition contains up to 12 weight percent, up to 10 weight percent, or up to 8 weight percent of the second (meth)acrylate polymer. The weight percent values are based on a total weight of the first monomer composition in the emulsion composition (i.e., the total weight of monomers in the first monomer composition).

The emulsion composition contains both the first monomer composition, the second (meth)acrylate polymer, and the hydrogenated hydrocarbon tackifier within the same droplets. Regarding the total polymerized or polymerizable material, the emulsion composition often contains 0.5 to 15 weight percent of the second (meth)acrylate polymer and 85 to 99.5 weight percent first monomer composition based on the total weight of the second (meth)acrylate polymer plus the weight of monomers in the first monomer composition. This is the total polymerized and polymerizable material in the emulsion composition (except for the small amount contributed by the polymerizable surfactant). Most of this polymerized and polymerizable material is present within the droplets of the emulsion (e.g., some of the acidic monomers may be dissolved in the first phase). In some examples, the emulsion composition can contain 1 to 15 weight percent of the second (meth)acrylate polymer and 85 to 99 weight percent of the first monomer composition, 2 to 12 weight percent of the second (meth)acrylate polymer and 88 to 98 weight percent first monomer composition, 2 to 10 weight percent of the second (meth)acrylate polymer and 90 to 98 weight percent first monomer composition, or 2 to 8 weight percent of the second (meth)acrylate polymer and 92 to 98 weight percent first monomer composition based on the total weight of the second (meth)acrylate polymer plus the weight of monomers in the first monomer composition.

In some particular embodiments, the first monomer composition contains a mixture of one or more alkyl (meth) acrylates having a linear or branched alkyl group with at least six carbon atoms, one or more cyclic alkyl (meth) acrylates, and one or more (meth)acrylic acids. The second (meth)acrylate is formed from a second monomer composition that contains one or more cyclic alkyl (meth)acrylates and one or more (meth)acrylic acids.

A hydrogenated hydrocarbon tackifier is also included in the emulsion composition. The hydrogenated hydrocarbon tackifier is typically a C9-based hydrocarbon tackifier. These tackifiers are derived mainly from C9 monomers with some other monomers present such as a mixture of vinyl toluenes, dicyclopenadiene, indene, methylstyrene, styrene, and methylindenes. The C9-based hydrocarbon tackifiers are commercially available from Eastman Chemical Company under the trade designation PICCO, KRISTALEX, PLASTOLYN, PICCOTAC, and ENDEX, from Cray Valley (Exton, Pa., USA) under the trade designations NORSOLENE, from Rutgers (The Netherlands) under the trade designation NOVAREZ, and from Kolon Industries, Inc. (South Korea) under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 60 percent, 70 percent, 90 percent, and 100 percent) hydrogenated. Hydrogenated hydrocarbon tackifiers are also available from Arakawa Chemical (USA) Inc. (Chicago, Ill., USA) under the trade designation ARKON (e.g., the P-type are fully hydrogenated and the M-type are partially hydrogenated). The partially hydrogenated resins typically have some aromatic rings. If the tackifier is not hydrogenated sufficiently, it may interfere with the polymerization reaction of the first monomer composition. In some embodiments, the hydrogenated hydrocarbon tackifier is fully hydrogenated. An example of such a tackifier is REGALREZ 1126.

The tackifier in the emulsion composition is often present in an amount in a range of 1 to 40 weight percent based on the total weight of the second (meth)acrylate copolymer plus the weight of monomers in the first monomer composition. In some embodiments, the amount of tackifier is at least 5 weight percent, at least 10 weight percent, or at least 15 weight percent and can be up to 35 weight percent, up to 30 weight percent, up to 25 weight percent, or up to 20 weight percent.

Other optional reactants can be included in the emulsion composition. For example, in some embodiments, a crosslinker is added that can react with multiple carboxylic acid groups (—COOH). The carboxylic acid groups can be on the second (meth)acrylate polymer, on the polymeric material formed from the first monomer composition, or on a combination of both polymeric materials. The use of the optional crosslinkers may increase the shear strength of the resulting pressure-sensitive adhesive. Suitable crosslinkers capable of reacting with multiple carboxylic acid groups include, but are not limited to, polyoxazolines such as those commercially available under the trade designation EPOCROS from Nippon Shokubai Co., LTD (Japan), polyaziridines (e.g., trimehtylolpropane tris(2-methyl-1-aziridine) propionate from PolyAziridine LCC (Medford, N.J., USA), polyamines, or the like. Other suitable crosslinkers include metal salts that can complex with multiple carboxylic acid groups. Suitable metals include, for example, zinc salts. If used, the optional crosslinker is often added in an amount equal to at least 0.01 weight percent based on the total weight of monomers in the first monomer composition. For example, the emulsion can contain at least 0.05 weight percent, at least 0.1 weight percent, or at least 0.5 weight percent of the crosslinker. The amount of the optional crosslinker is often up to 3 weight percent based on the total weight of monomers in the first monomer composition. For example, the emulsion composition can contain up to 2.5 weight percent, up to 2 weight percent, up to 1.5 weight percent, or up to 1 weight percent of the optional crosslinker.

In many embodiments, an optional neutralizing agent is added to the emulsion composition. The neutralizing agent can be added, for example, to improve the reactivity of the crosslinker, to improve the stability of the resulting latex composition, or the like. Suitable neutralizing agents are often strong or weak bases such as, for example, ammonium hydroxide, ammonia, sodium acetate, potassium acetate, sodium hydroxide, potassium hydroxide, and lithium hydroxide. The neutralizing agent is often added to increase the pH of the emulsion composition to at least 4.0, at least 4.5, at least 5.0, at least 5.5, at least 6.0, at least 6.5, or at least 7.0.

The emulsion composition typically further includes an initiator. While either a water soluble or oil soluble initiator can be used, the initiator is typically selected to be soluble in water. If the initiator is oil soluble, it is typically added to the mixture (solution) of monomers of the first monomer composition and the second (meth)acrylate polymer before this mixture (solution) is combined with the first phase of the emulsion composition. If the initiator is water soluble, it is often added after formation of the droplets within the first phase of the emulsion composition. If a reducing agent is used, it is usually water soluble and is added to the first phase.

Examples of water soluble initiators include, but are not limited to, hydrogen peroxide and various persulfate salts such as sodium persulfate, potassium persulfate, and ammonium persulfate. Optional reducing agents can be added to lower the temperature needed for initiation of the polymerization reaction. Suitable reducing agents include, but are not limited to, ascorbic acid, bisulfite salts (e.g., sodium bisulfite, potassium bisulfite, and ammonium bisulfite), and sodium formaldehyde sulfoxylate. The amount of initiator and optional reducing agent can each be up to 1 weight percent based on the weight of monomers in the first monomer composition. For example, the amounts can be up to 0.8 weight percent, up to 0.5 weight percent, up to 0.3 weight percent, or up to 0.2 weight percent based on a total weight of monomers in the first monomer composition. The amount is initiator and optional reducing agent each can be at least 0.01 weight percent, at least 0.05 weight percent, or at least 0.1 weight percent based on the total weight of monomers in the first monomer composition.

Examples of oil soluble initiators include, but are not limited to, azo compounds or peroxides such as those mentioned above for the formation of the second (meth) acrylate polymer. If such initiators are used, they are used in the same amount as described above for water soluble initiators.

In many emulsion compositions, a chain transfer agent is not used. As described above, however, a chain transfer agent can be used (and usually is used) in the formation of the second (meth)acrylate polymer.

The emulsion composition can be prepared by any suitable process that results in the formation of droplets containing the second (meth)acrylate polymer and the hydrogenated hydrocarbon tackifier dissolved in monomers of the first monomer composition. In many embodiments, the second (meth)acrylate polymer is initially mixed with monomers included in the first monomer composition or with the monomers of the first monomer composition plus the hydrogenated hydrocarbon tackifier. The monomers are often used in their neat form without the addition of any solvent. Once the solution containing the second (meth)acrylate polymer, the first monomer composition, and the hydrogenated hydrocarbon tackifier has been formed, the solution can be combined with water or with water and other components of the emulsion composition using high shear mixing. In some embodiments, the polymerizable surfactant and neutralizing agent can be dissolved in (or combined with) the water prior to mixing.

With high shear mixing, droplets form within the first phase (i.e., aqueous phase). Prior to any polymerization of the first monomer composition, the droplets contain a mixture of i) the second (meth)acrylate polymer, ii) at least 90 weight percent of the first monomer composition, and iii) the hydrogenated hydrocarbon tackifier, wherein the second (meth)acrylate polymer and the hydrogenated hydrocarbon tackifier are dissolved in the first monomer composition within the droplets. Stated differently, the first monomer composition, the second (meth)acrylate polymer, and the hydrogenated hydrocarbon tackifier are miscible and are present together within the same droplets. Typically, the droplets includes at least 92 weight percent, at least 95 weight percent, at least 97 weight percent, at least 98 weight percent, or at least 99 weight percent of the monomers in the first monomer composition. The polymerizable surfactant is likely to be at the interface between the droplets and the first phase or dissolved in first phase. Most of the polymerizable surfactant is likely to be at the interface. In many embodiments, any initiator, and/or reducing agent, and/or neutralizing agents included in the emulsion composition are likely to be dissolved in the first phase.

The droplets suspended in the first phase typically have an average diameter up to about 2000 nanometers, up to 1500 nanometers, up to 1000 nanometers, up to 900 nanometers, up to 800 nanometers, up to 700 nanometers, up to 600 nanometers, or up to 500 nanometers. The average diameter is typically at least 100 nanometers, at least 200 nanometers, at least 300 nanometers, or at least 400 nanometers. The average size can be determined using dynamic light scattering methods. In some embodiments, the average droplet size (diameter) is in a range of 100 to 2000 nanometers, in a range of 200 to 1000 nanometers, in a range of 300 to 1000 nanometers, in a range of 200 to 800 nanometers, or in a range of 400 to 700 nanometers.

In many embodiments, the emulsion composition is considered to be a mini-emulsion. As used herein, the term "mini-emulsion" refers to an emulsion method that uses high shear to make droplets having an average diameter no greater than 1 micrometer. Polymerization occurs within the droplets to form polymeric latex particles. Polymerization is limited to that which occurs within the droplets.

The first monomer composition of the emulsion composition is typically polymerized at room temperature (e.g., about 20° C. to about 25° C.) or at a temperature above room temperature. The temperature is often at least 30° C., at least 40° C., or at least 50° C. The temperature can be up to the boiling temperature of the emulsion composition (e.g., about 100° C.). In some embodiments, the temperature can be up to 80° C., up to 70° C., or up to 60° C. Any heat generated during polymerization is rapidly moderated by the effect of the heat capacity of the first phase. The reaction time can be any length of time needed to complete the polymerization reaction. In some embodiments, the reaction time can be at least 1 hour, at least 2 hours, at least 3 hours, or at least 4 hours. The reaction time is up to 24 hours or longer, up to 16 hours, or up to 8 hours. The reactor is often purged with an inert gas such as nitrogen.

The polymerized product of the emulsion composition is a latex composition. That is, the latex composition contains water and polymeric particles that are a polymerized product of the emulsion composition as described above. The terms "latex" and "latex composition" may be used interchangeably. The terms "polymeric particle" and "latex particles" and "polymeric latex particles" may be used interchangeably. The second (meth)acrylate polymer plus the polymerized product of the first monomer composition (the first (meth)acrylate polymer) plus the hydrogenated hydrocarbon tackifier are present within the same latex particles. The latex composition contains latex particles having an average size comparable to the average size of the droplets within the emulsion composition prior to polymerization. More particularly, the average particle size of the latex particles is roughly equal to or slightly larger than the average droplet size within the emulsion composition due to density differences.

The latex particles are typically suspended (e.g., dispersed) in the water phase (first phase). Preferably, the latex particles are not coagulated together. The latex particles include both the second (meth)acrylate polymer and the first (meth)acrylate polymer. The molecular weight of the first (meth)acrylate polymer is typically higher than the molecular weight of polymeric materials of the same overall chemical composition formed using other processes. More specifically, the molecular weight of the first (meth)acrylate polymer formed by emulsion polymerization can be close to 1 million Daltons.

In contrast to the emulsion polymerization method used to form the first (meth)acrylate polymer, a typical molecular weight of polymers formed from the same monomers using solution polymerization or bulk polymerization methods is often less than 500,000 Daltons. With both solution polymerization and bulk polymerization methods, the molecular weight is usually controlled by the initiator concentration. That is, higher initiator concentrations tend to produce lower molecular weight polymers. Therefore, in order to produce high molecular weight polymers using solution polymerization or bulk polymerization methods, extremely low initiator concentrations are required. However, if extremely low initiator concentrations are used, the polymerization time may be unacceptably long. Such processes may be economically impractical to prepare high molecular weight polymeric materials. The high molecular weight polymeric materials, however, are often desirable for some adhesive applications such as where high shear strength is necessary.

With emulsion polymerization methods, the molecular weight of the polymeric material (e.g., the molecular weight of the first (meth)acrylate polymer) can be controlled by both initiator concentration and the number of particles (i.e., number of droplets in the emulsion). Higher initiator concentrations often result in lower molecular weights and faster reaction times. Higher particle numbers, however, tend to favor higher molecular weights and faster reaction times.

Due to the high molecular weight of the polymeric materials formed from emulsion compositions, crosslinking structures can often form more easily compared to polymeric materials formed using solution polymerization and bulk polymerization methods even in the absence of additional crosslinkers. Two possible types of crosslinking can occur in the polymeric materials formed by emulsion polymerization: 1) physical entanglement and 2) chemical crosslinking due to the chain transfer reactions to a polymeric chain. Physical entanglement can be enhanced with longer polymeric chains resulting from the increased average molecular weight. Chain transfer reactions can form crosslinking structures for long polymeric chains.

The latex particles typically have a single glass transition temperature as determined using a Differential Scanning Calorimeter. More specifically, there is a single peak in the plot of reversible heat flow versus temperature for the dry polymeric material (dry latex particles) during the second heating cycle using Modulated Differential Scanning Calorimetry. The $T_g$ is typically no greater than 0° C., no greater than −10° C., or no greater than −20° C.

The latex composition can be combined with an optional second tackifier. The addition of the second tackifier can be used to further increase adhesion. Any suitable second tackifier can be used such as rosin acids and their derivatives (e.g., rosin esters); terpene resins such as polyterpenes (e.g., alpha pinene-based resins, beta pinene-based resins, and limonene-based resins, and aromatic-modified polyterpene resins (e.g., phenol modified polyterpene resins)); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

In many embodiments, the second tackifier is a rosin ester or includes a rosin ester. Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Often, it is desirable to use a second tackifier that can be dispersed in water. Water dispersion of rosin esters are available under the trade designation SNOWTACK from Lawter, Inc. (Chicago, Ill., USA). Other suitable water dispersed tackifiers are commercially available under the trade designation TACOLYN from Eastman Chemical Company that include, for example, rosin ester resin dispersions, hydrogenated rosin ester resin dispersions, aliphatic hydrocarbon resin dispersions, and aromatic modified hydrocarbon resin dispersion.

If present, the optional second tackifier in the latex composition is often used in an amount so that the total weight of tackifier (the total weight of the optional second tackifier plus the hydrogenated hydrocarbon tackifier included in the emulsion composition) is in a range of 1 to 40 weight percent based on the total weight of the polymeric latex particles. In some embodiments, the amount of second tackifier is at least 5 weight percent, or at least 10 weight percent and can be up to 35 weight percent, up to 30 weight percent, up to 25 weight percent, or up to 20 weight percent.

Other optional components that can be added to the latex composition are thickeners. Example thickeners are typically aqueous polymer solutions such as those available under the trade designation PARAGUM from Royal Coatings and Specialty Polymers (South Bend, Ind., USA). If added, the optional thickeners can be used in an amount up to 5 weight percent based on the total weight of the latex composition (e.g., water and polymeric latex particles). For example, the thickener can be used in an amount up to 4 weight percent, up to 3 weight percent, up to 2 weight percent, or up to 1 weight percent. In some embodiments, the thickener is in a range of 0 to 5 weight percent, 0.1 to 5 weight percent, 0.1 to 2 weight percent, 0.1 to 1 weight percent, 0.2 to 0.8 weight percent, or 0.4 to 0.6 weight percent.

The latex composition typically is dried to form a pressure-sensitive adhesive. The compositions are typically dried to remove at least 90 weight percent of the water. For example, at least 95 weight percent, at least 97 weight percent, at least 98 weight percent, or at least 99 weight percent of the water is removed. The water content of the dried pressure-sensitive adhesive many increase or decrease depending on the environmental humidity. In some embodiments, the latex composition is coated on a substrate such as a backing layer or release liner prior to drying. Drying typically occurs at temperatures above room temperature but not at a temperature that would distort or degrade the substrate and/or the pressure-sensitive adhesive layer. In some embodiments, the drying occurs at temperatures in a range of about 40° C. to about 120° C. and for a time sufficient to lower the water content to the desired level.

The pressure-sensitive adhesive layer can have any desired thickness. In many embodiments, the adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the adhesive layer can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

Various types of articles can be prepared that include a substrate and a pressure-sensitive adhesive layer positioned adjacent to (and adhered to) a major surface of the substrate. Any suitable substrate can be used in the article and the substrate is often selected depending on the particular application. For example, the substrate can be flexible or inflexible and can be formed from a polymeric material, glass or ceramic material, metal or metal alloy, or combination thereof. Some substrates are polymeric materials such as those prepared, for example, from polyolefins (e.g., polyethylene, polypropylene, or copolymers thereof), polyurethanes, polyvinyl acetates, polyvinyl chlorides, polyesters (e.g., polyethylene terephthalate or polyethylene naphthalate), polycarbonates, polyacrylates such as polymethyl (meth)acrylates (PMMA), ethylene-vinyl acetate copolymers, neoprenes, and cellulosic materials (e.g., cellulose acetate, cellulose triacetate, and ethyl cellulose). The substrate can be in the form of foils or films or sheets, nonwoven materials (e.g., paper, fabric, nonwoven scrims), foams, and the like.

For some substrates, it may be desirable to treat the surface of the substrate to improve adhesion to the pressure-sensitive adhesive layer. Such treatments include, for example, application of primer layers, surface modification layer (e.g., corona treatment or surface abrasion), or both. Illustrative examples of suitable chemical primer layer types include urethanes, silicones, epoxy resins, vinyl acetate resins, ethyleneimines, and the like. Urethane and silicone types are particularly effective chemical primers for use with polyester film substrates. One suitable silicone type of primer layer has a continuous gelled network structure of inorganic particles, and is described in Japanese Unexamined Pat. Publication (Kokai) No. 2-200476. This primer layer has a strong affinity for polyester resins and polyolefin resins. Illustrative examples of chemical primers for vinyl and polyethylene terephthalate films include the crosslinked acrylic ester/acrylic acid copolymers disclosed in U.S. Pat. No. 3,578,622 (Brown et al.).

In some embodiments, the substrate is a release liner. Release liners typically have low affinity for the pressure-sensitive adhesive layer. Exemplary release liners can be prepared from paper (e.g., Kraft paper) or other types of polymeric material. Some release liners are coated with an outer layer of a release agent such as a silicone-containing material or a fluorocarbon-containing material.

Some articles are adhesive tapes. The adhesive tapes can be single-sided adhesive tapes with the pressure-sensitive adhesive on a single side of the backing layer or can be double-sided adhesive tape with a pressure-sensitive adhesive layer on both major surfaces of the backing layer. The backing layer is often a polymeric film, fabric, or foam. Each pressure-sensitive adhesive layer may be positioned, if desired, between the backing layer and a release layer.

Any suitable backing layer can be used. In some embodiments, the backing layer is an oriented polyolefin film. For example, the oriented polyolefin film can prepared as described in U.S. Pat. No. 6,638,637 (Hager et al.). Such backings layers often include multiple layers of polyolefins with at least two different melting points and that are biaxially oriented. In another example, the oriented polyolefin film can be prepared as described in U.S. Pat. No. 6,451,425 (Kozulla et al.). Such backings often include an isotactic polypropylene that is blended or mixed with at least one second polyolefin such as polyethylene, polybutylene, or syndiotactic polypropylene. These backings are typically biaxially oriented.

For adhesive tapes with a single pressure-sensitive adhesive layer, the backing layer often has a first surface that has been treated (i.e., primed) to improve adhesion to the pressure-sensitive adhesive layer. The backing layer has a second surface opposite the first surface that has a low adhesion to the pressure-sensitive adhesive layer. Such an adhesive tape can be formed into a roll. In some embodiments, the adhesive tapes are packaging tapes.

Other articles are transfer tapes in which a pressure-sensitive adhesive layer is positioned adjacent to a release liner. The transfer tape can be used to transfer the pressure-sensitive adhesive layer to another substrate or surface. Any suitable release liner can be used. In many embodiments, the release liner has a release layer coating adjacent to a substrate. Suitable substrates include, but are not limited to, paper such as poly-coated Kraft paper and super-calendered or glassine Kraft paper; cloth (fabric); nonwoven web; metal or metal alloy including metal foil; polyesters such as poly(alkylene terephthalate) such as poly(ethylene terephthalate), poly(alkylene naphthalate) such as poly(ethylene naphthalate); polycarbonate; polyolefins such as polypropylene, polyethylene, polybutylene, and copolymers thereof; polyamide; cellulosic materials such as cellulose acetate or ethyl cellulose; and combinations thereof.

In some exemplary embodiments, the release liners have a release coating containing a polymerized product of a vinyl-silicone copolymers as described in U.S. Pat. No. 5,032,460 (Kantner et al.). In other exemplary embodiments, the release liner has a release coating containing a polymerized product of a (meth)acrylate-functionalized siloxane as described in U.S. Patent Application Publication 2013/059105 (Wright et al.). Such release coatings can be prepared by applying a coating of a polymerizable composition containing the (meth)acrylate-functionalized polysiloxane to a surface of a substrate and then irradiating the coating with ultraviolet radiation. The ultraviolet radiation is often provided by short wavelength polychromatic ultraviolet light source having at least one peak with intensity at a wavelength in the range of about 160 to about 240 nanometers. Suitable short wavelength polychromatic ultraviolet light sources include, for example, low pressure mercury vapor lamps, low pressure mercury amalgam lamps, pulsed Xenon lamps, and glow discharge from a polychromic plasma emission source. The coatings applied to the substrate can be free or substantially free (e.g., less than 0.1 weight percent, less than 0.01 weight percent, or less than 0.001 weight percent) of a photoinitiator based on the total weight of the coatings.

The pressure-sensitive adhesive layer is often positioned between a first substrate and a release liner. The first substrate can be another release liner or a backing layer. The backing layer can be a polymeric film or foam. For example, the foam can be a polyolefin, acrylic polymer, or any other suitable polymeric material. The film can be a polyester or any other suitable polymeric material.

The pressure-sensitive adhesive layers are formed from latex particles that contain the first (meth)acrylate polymer, the second (meth)acrylate polymer, and the hydrogenated hydrocarbon tackifier within the same particles. These pressure-sensitive adhesives tend to have better adhesive properties such as peel strength, shear strength (i.e., cohesive strength), peel creep (which is related to a combination of peel strength and sheer strength), or a combination thereof compared to pressure-sensitive adhesives that are formed from (1) a blend of latex particles containing both the first (meth)acrylate polymer and the second (meth)acrylate polymer and latex particles containing the hydrogenated hydrocarbon tackifier, (2) a blend of latex particles containing both the first (meth)acrylate polymer and the hydrogenated hydrocarbon tackifier and latex particles containing the second (meth)acrylate polymer, (3) latex particles containing the first (meth)acrylate polymer and the second (meth) acrylate polymer but not the hydrogenated hydrocarbon tackifier, or (4) latex particles containing the first (meth) acrylate polymer and the hydrogenated hydrocarbon tackifier but not the second (meth)acrylate polymer. In particular, the high temperature peel creep (at temperatures close to 70° C.) is often superior.

The pressure-sensitive adhesive layers often have both high peel adhesion and high shear strength (i.e., cohesion) to both smooth and rough surfaces. As such, the pressure-sensitive adhesives can be used in articles having a diverse range of uses and can be adhered to a variety of substrates.

In some specific embodiments, the substrate is a polymeric film or sheet, metal or metal alloy, fabric, or foam.

Embodiment 1 is an emulsion composition that contains a) water, b) a polymerizable surfactant having an unsaturated group that can undergo free radical polymerization, c) a first monomer composition, d) a second (meth)acrylate polymer, and e) a hydrogenated hydrocarbon tackifier. The first monomer composition includes an alkyl (meth)acrylate having a linear or branched alkyl group with at least six carbon atoms. The second (meth)acrylate polymer is present in an amount of 0.5 to 15 weight percent based on a total weight of monomers in the first monomer composition and has a glass transition temperature greater than or equal to 50° C. The second (meth)acrylate polymer is formed from a second monomer composition containing at least 50 weight percent of a cyclic alkyl (meth)acrylate based on a total weight of monomers in the second monomer composition, wherein the cyclic alkyl group has at least six carbon atoms. The emulsion composition contains a first phase that includes the water and a second phase dispersed as droplets within the first phase. The droplets contain a mixture of i) at least 90 weight percent of the first monomer composition, ii) the second (meth)acrylate polymer, and iii) the hydrogenated hydrocarbon tackifier. The second (meth)acrylate polymer and the hydrogenated hydrocarbon tackifier are not miscible with the first phase and are dissolved in the first monomer composition within the droplets.

Embodiment 2 is the emulsion composition of embodiment 1, wherein the cyclic alkyl (meth)acrylate in the second monomer composition has a glass transition temperature equal to at least 80° C. when measured as a homopolymer.

Embodiment 3 is the emulsion composition of embodiment 1 or 2, wherein the first monomer composition further comprises a cyclic alkyl (meth)acrylate, polar monomer, or both.

Embodiment 4 is the emulsion composition of any one of embodiments 1 to 3, wherein the first monomer composition comprises 60 to 98 weight percent of the alkyl (meth)acrylate having a linear or branched alkyl group with at least six carbon atoms, 1 to 30 weight percent of a cyclic alkyl (meth)acrylate, and 1 to 10 weight percent of the polar monomer or 60 to 99 weight percent of the alkyl (meth)acrylate having a linear or branched alkyl group with at least six carbon atoms, 0 to 30 weight percent of a cyclic alkyl (meth)acrylate, and 1 to 10 weight percent of the polar monomer based on a total weight of monomers in the first monomer composition.

Embodiment 5 is the emulsion composition of any one of embodiments 1 to 4, wherein the second monomer composition comprises 50 to 100 weight percent of a cyclic alkyl (meth)acrylate and 0 to 50 weight percent of an optional monomer that is a polar monomer, an alkyl (meth)acrylate having a linear or branched alkyl group, a vinyl monomer that does not have a (meth)acryloyl group, (meth)acrylamide, (meth)acrylonitrile, N-alkyl (meth)acrylamide, N,N-dialkyl (meth)acrylamide, or a mixture thereof based on a total weight of monomers in the second monomer composition.

Embodiment 6 is the emulsion composition of any one of claims 1 to 5, wherein the second monomer composition comprises 90 to 99 weight percent of the cyclic alkyl (meth)acrylate and 1 to 10 weight percent polar monomer or 90 to 100 weight percent of the cyclic alkyl (meth)acrylate and 0 to 10 weight percent polar monomer based on a total weight of monomers in the second monomer mixture.

Embodiment 7 is the emulsion composition of any one of embodiments 1 to 6, wherein the first monomer composition is different than the second monomer composition.

Embodiment 8 is the emulsion composition of any one of embodiments 1 to 7, wherein the second (meth)acrylate polymer was a weight average molecular weight in a range of 3,000 to 150,000 grams/mole or in the range of 10,000 to 150,000 grams/mole.

Embodiment 9 is the emulsion composition of any one of embodiments 1 to 8, wherein the hydrogenated hydrocarbon tackifier is present in an amount in a range of 1 to 40 weight percent based on a total weight of monomers in the first monomer composition and the weight of the second (meth)acrylate polymer.

Embodiment 10 is the emulsion composition of any one of embodiments 1 to 9, wherein the emulsion composition contains at least 25 weight percent water based on a total weight of the emulsion composition.

Embodiment 11 is the emulsion composition of any one of embodiments 1 to 10, wherein the emulsion composition contains up to 90 weight percent water based on the total weight of the emulsion composition.

Embodiment 12 is the emulsion composition of any one of embodiments 1 to 11, wherein the polymerizable surfactant is a propenyl polyoxyethylene alkylphenyl compound or propenyl polyoxyethylene alkylphenyl ether ammonium sulfate compound.

Embodiment 13 is the emulsion composition of any one of embodiments 1 to 12, wherein the polymerizable surfactant is sodium dodecylallyl sulfosuccinate or a phosphate ester.

Embodiment 14 is the emulsion composition of any one of embodiments 1 to 13, wherein the emulsion composition contains at least 0.5 weight percent polymerizable surfactant based on the total weight of monomers in the first monomer composition.

Embodiment 15 is the emulsion composition of any one of embodiments 1 to 14, wherein the emulsion composition contains up to 2 weight percent polymerizable surfactant based on the total weight of monomers in the first monomers composition.

Embodiment 16 is the emulsion composition of any one of embodiments 1 to 15, wherein the first monomer composition comprises one or more alkyl (meth)acrylates having a linear or branched alkyl group with at least six carbon atoms, one or more cyclic alkyl (meth)acrylates, and one or more (meth)acrylic acids and wherein the second (meth)acrylate polymer is formed from a second monomer composition comprising one or more cyclic alkyl (meth)acrylates and one or more (meth)acrylic acids.

Embodiment 17 is a latex composition comprising a polymerized product of the emulsion composition of any one of embodiments 1 to 16, wherein the latex composition comprises polymeric latex particles.

Embodiment 18 is the latex composition of embodiment 17, wherein the polymeric latex particles have a single glass transition temperature as determined using a Differential Scanning Calorimeter.

Embodiment 19 is the latex composition of embodiment 17 or 18, wherein the second (meth)acrylate polymer, a polymerized product of the first monomer composition, and the hydrogenated hydrocarbon tackifier are together in the same polymeric particles.

Embodiment 20 is the latex composition of any one of embodiments 17 to 19, further comprising a second tackifier that is water dispersible.

Embodiment 21 is the latex composition of any one of embodiments 17 to 20, wherein the polymerized product of the emulsion composition comprises polymerized surfactant in an amount in a range of 1 to 2 weight percent based on a total weight of the polymeric latex particles.

Embodiment 22 is a pressure-sensitive adhesive comprising a dried product of the latex composition of any one of embodiments 17 to 21.

Embodiment 23 is an article comprising (a) a substrate and (b) a first pressure-sensitive adhesive layer positioned adjacent to a first major surface of the substrate, wherein the first pressure-sensitive adhesive layer comprises the pressure-sensitive adhesive of embodiment 22.

Embodiment 24 is the article of embodiment 23, further comprising a second layer of pressure-sensitive adhesive of embodiment 22 positioned adjacent to a second major surface of the substrate.

Embodiment 25 is the article of embodiment 23 or 24, wherein the substrate is a foam or polymeric film.

Embodiment 26 is the article of any one of embodiments 23 to 25, wherein the substrate is a biaxially oriented polyolefin film.

Embodiment 27 is the article of any one of embodiments 23 to 25, wherein the substrate is a release liner.

Embodiment 28 is the article of embodiment 27, wherein the release liner comprises a release coating comprising a polymerized product of a vinyl-silicone copolymer or a (meth)acrylate-functionalized siloxane.

Embodiment 29 is the article of embodiment 27 or 28, wherein the article is a transfer tape.

Embodiment 30 is the article of embodiment 23 to 26, wherein the article is an adhesive tape.

Embodiment 31 is the article of embodiment 30, wherein the adhesive tape is a packaging tape.

Embodiment 32 is the article of any one of embodiments 23 to 26, wherein the substrate has a low energy surface.

Embodiment 33 is the article of embodiment 32, wherein the low energy surface comprises a polyolefin or a clear coat.

Embodiment 34 is the article of embodiment 32, wherein the pressure-sensitive adhesive layer is positioned between a first substrate that is a foam and a second substrate that is a release liner.

Embodiment 35 is the article of embodiment 34, wherein the foam is a polyolefin or acrylic polymer.

Embodiment 36 is a method of forming a pressure-sensitive adhesive. The method includes (a) forming an emulsion composition of any one of embodiments 1 to 16, (b) polymerizing the emulsion composition to form a latex composition comprising polymeric latex particles, and (c) drying the latex composition to form the pressure-sensitive adhesive.

Embodiment 37 is the method of embodiment 36 wherein forming the emulsion composition comprises forming the second (meth)acrylate polymer, dissolving the second (meth)acrylate polymer in one or more monomers in the first monomer composition and the hydrogenated hydrocarbon tackifier to form a polymer solution, adding the polymer solution to the first phase, and forming droplets of the polymer solution within the first phase by mixing with high shear.

EXAMPLES

All parts, percentages, ratios, etc. used in the Examples are by weight unless indicated otherwise.

As used herein, the term "pph" refers to parts per hundred.

TABLE 1

Materials

| Abbreviation | Description | Supplier |
|---|---|---|
| EHA | 2-Ethylhexyl acrylate | Dow Chemical (Midland, MI, USA) |
| IBOA | Isobornyl acrylate | San Esters (New York, NY, USA) |
| IBOMA | Isobornyl methacrylate | Sigma Aldrich (St. Louis, MO, USA) |
| IOA | Isooctyl acrylate | 3M Company (St. Paul, MN, USA) |
| AA | Acrylic acid (99%) | Alfa Aesar (Ward Hill, MA, USA) |
| MAA | Methacrylic acid (99%) | Alfa Aesar (Ward Hill, MA, USA) |
| EtOAC | Ethyl acetate | Sigma Aldrich (St. Louis, MO, USA) |
| MEHQ | Methoxyether hydroquinone | Sigma Aldrich (St. Louis, MO, USA) |
| IOTG | Isooctyl thioglycolate | Sigma Aldrich (St. Louis, MO, USA) |
| IRGACURE 651 | 2,2-Dimethoxy-1,2-diphenyl-ethanone | BASF (Ludwigshafen, Germany) |
| IRGANOX 1010 | Pentaerythritol tetrakis (3-(3,5-di-tert-butyl-4-hydroxyphenyl)propionate) | BASF (Ludwigshafen, Germany) |
| LUPERSOL 101 | 2,5-Dimethyl-2,5-di(t-butylperoxy)hexene | Atofina (Philadelphia, PA, USA) |
| LUPERSOL 130 | 2,5-Dimethyl-2,5-di(t-butylperoxy)hexyne-3 | Atofina (Philadelphia, PA, USA) |
| VAZO 52 | 2,2'-Azobis(2,4-dimethylpentanenitrile) | DuPont (Wilmington, DE, USA) |
| VAZO 67 | 2,2'-Azobis(2-methylbutanenitrile) | DuPont (Wilmington, DE, USA) |
| VAZO 88 | 1,1'-Azobis(cyclohexanecarbonitrile) | DuPont (Wilmington, DE, USA) |
| KPS | Potassium persulfate (99.9% purity) | Alfa Aesar (Ward Hill, MA, USA) |
| $Na_2S_2O_5$ | Sodium bisulfate (97% purity) | Alfa Aesar (Ward Hill, MA, USA) |
| $FeSO_4 \cdot 7H_2O$ | Ferrous sulfate heptahydrate | Sigma Aldrich (St. Louis, MO, USA) |
| TRITON X-100 | Nonionic surfactant | Dow Chemical (Midland, MI, USA) |
| DS-4 | Sodium dodecyl benzene sulfonate surfactant (23 wt. % solids solution in water) | Solvay (Houston, TX, USA) |
| DS-10 | Sodium dodecyl benzene sulfonate surfactant | Solvay (Houston, TX, USA) |

TABLE 1-continued

Materials

| Abbreviation | Description | Supplier |
| --- | --- | --- |
| HITENOL BC-1025 | Polyoxyethylene alkylphenyl propenyl ether ammonium sulfate (25 wt. % solids solution in water), which is a polymerizable surfactant | Montello Inc. (Tulsa, Oklahoma, USA) |
| REGALREZ 1126 | Hydrocarbon tackifier | Eastman (Kingsport, TN, USA) |
| MAC 8000 testing panel | MAC 8000 is an automotive clearcoat manufactured by PPG, identified as TAMC8000FR. | ACT (Detroit, MI, USA) |
| SHRE testing panel | The paint on panel identified as "SHRE" is an automotive clearcoat manufactured by BASF, code number R10CG060X, trade designation UREGLOSS | ACT (Detroit, MI, USA) |
| TPO 3131 testing panel | Panel made with HIFAX ETA-3131 thermoplastic olefin resin | LyondellBasell (Houston, TX, USA) |
| GM TPO testing panel | Panel with HIFAX TRC779X resin | LyondellBasell (Houston, TX, USA) |
| PP testing panel_1 | 3/16" thick natural polypropylene, 2" × 5" × 3/16" | Aeromat Plastics (Burnsville, MN, USA) |
| PP testing panel_2 | 1/8" thick natural polypropylene, 2" × 6" × 0.125" | Aeromat Plastics (Burnsville, MN, USA) |
| ABS testing panel | Automotive grade ABS | Standard Plaque, Inc. (Melvindale, MI, USA) |
| 5AS foam | Polyolefin foam | Sekisui (Lawrence, MA, USA) |
| TEGO RC-902 | Silicone acrylate with a high silicone to acrylate ratio | Evonik North America, Inc. (Parsippany, NJ, USA) |
| TEGO RC-711 | Silicone acrylate with a low silicone to acrylate ratio | Evonik North America, Inc. (Parsippany, NJ, USA) |
| PARAGUM 500 | Polyacrylate thickener | Royal Coatings & Specialty Polymers (South Bend, IN, USA) |
| BOPP | Biaxially-oriented polypropylene film; such films are further described in the following patents: U.S. Pat. No. 6,638,637, U.S. Pat. No. 6,451,425, U.S. Pat. No. 3,324,218, U.S. Pat. No. 3,241,662, and U.S. Pat. No. 5,032,460. A first major surface of the film was coated with a chlorinated polyolefin primer (18-23 weight percent chlorine) in toluene that was obtained from Eastman Chemical (Kingsport, TN, USA). The second major surface of the film was coated with a low adhesion backside, which was a solvent-based polyurethane that is commercially available from Mayzo (Suwanee, GA, USA) | 3M Co. (Saint Paul, MN, USA) |
| HOSTAPHAN 3SAB | Primed poly(ethylene terephthalate) ("PET") film, 2.0 mil (0.002 inches, approximately 51 micrometer), available from Mitsubishi Polyester Film, Inc. (Greer, SC, USA) under the trade designation "HOSTAPHAN 3SAB" | Mitsubishi Polyester Film, Inc. (Greer, SC, USA) |
| 3M 200MP liner | "58# POLYCOATED KRAFT PAPER (PCK)" liner, 107 micrometers thick, used in transfer tape available from 3M Co. under the trade designation "467MP" | 3M Co. (Saint Paul, MN, USA) |

Test Method 1: Polymer Molecular Weight Measurement

The molecular weight distribution of the compounds was characterized using gel permeation chromatography (GPC). The GPC instrumentation, which was obtained from Waters Corporation, Milford, Mass., included a high pressure liquid chromatography pump (Model 1515HPLC), an auto-sampler (Model 717), a UV detector (Model 2487), and a refractive index detector (Model 2410). The chromatograph was equipped with two 5 micrometer PLgel MIXED-D columns available from Varian Inc. (Palo Alto, Calif., USA).

Samples of polymeric solutions were prepared by dissolving polymer or dried polymer samples in tetrahydrofuran at a concentration of 0.5 to 2 percent (weight/volume) and filtering through a 0.2 micrometer polytetrafluoroethylene filter that is available from VWR International, West Chester, Pa. The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight ($M_W$) and the polydispersity index (weight average molecular weight divided by number average molecular weight ($M_n$)) were calculated for each sample against this standard calibration curve.

Test Method 2: Viscosity

The viscosity was measured with a Brookfield viscometer and spindle 3 (obtained from Brookfield Engineering, Middleboro, Mass., USA), at rotating speed of 30 rpm.

Test Method 3: Latex Weight Percent (wt. %) Solids

To measure solid content, first an aluminum dish was weighed, then about 0.2 g to 0.3 g of latex was added in the dish, then the latex was diluted by adding about 0.5 g distilled deionized water. The dish was then heated in 80° C. oven for about 4 hours until the weight did not change any more. The wt. % solids was calculated according to the following equation:

$$\text{Wt. \% solids} = 100 \times (W2-W1)/(W3-W1)$$

In this equation, W2 is the weight of the dish plus the weight of the dried polymer latex, W1 is the weight of the dish, and W3 is the weight of the dish plus the weight of the wet polymer latex.

Test Method 4: Latex pH

The latex pH was measured with a pH meter (from Chemtrix, Rolling Hills Estates, Calif., USA under the trade designation "MODEL 60A pH METER").

Test Method 5: Glass Transition of Polymer ($T_g$) by Differential Scanning Calorimetry (DSC)

Polymer samples were dried to remove water and/or organic solvent. The dried samples were then weighed and loaded into TA Instruments $T_{zero}$ aluminum hermetic DSC sample pans. The samples were analyzed using a TA Instruments Q2000 MODULATED DIFFERENTIAL SCANNING CALORIMETER ("Q2000 MDSC", including RC-03761 sample cell), utilizing a heat-cool-heat method in temperature-modulated mode (−90° C. to 125° C. at 5° C./min. with a modulation amplitude of ±0.796° C. and a period of 60 seconds) under a nitrogen atmosphere. TA Instruments is located in New Castle, Del., USA.

In temperature modulated mode, the Q2000 MDSC gave three signals: cumulative (standard) heat flow, reversing (Rev) heat flow, and nonreversing (Nonrev) heat flow. The cumulative heat flow signal was the sum of the reversing and nonreversing heat flow signals. The reversing signal was the heat capacity (Cp) component, which exhibited changes in heat capacity and included transitions such as the $T_g$ (glass transition). The nonreversing signal was the kinetic component and included kinetic transitions such as crystallization and chemical reactions.

Following data collection, the thermal transitions were analyzed using the TA UNIVERSAL ANALYSIS program. If present, any glass transitions ($T_g$) or significant endothermic or exothermic peaks were evaluated. The glass transition temperatures were evaluated using the step change in the standard heat flow (HF) or reversing heat flow (Cp related/REV HF) curves. The onset, midpoint (half height), and end temperatures of the transition were noted as well as the change in heat capacity observed at the glass transition were calculated. Any peak transitions were evaluated using the heat flow (HF), reversing heat flow (Rev HF) or nonreversing heat flow (Nonrev HF) curves. Peak area values and/or peak minimum/maximum temperatures were also determined. The peak integration results were normalized for sample weight and reported in J/g.

Test Method 6: Particle Size Via Dynamic Light Scattering

For a polymer dispersion (or latex) with average particle size smaller than 1 micrometer, the average particle size of latex samples was measured with dynamic light scattering instrument (ZETASIZER NANO ZS, available from Malvern Instruments Ltd. (Worcestershire, UK)) with diluted latex sample (approximately one drop of latex in 5 mL of water), following the manufacturer's instructions, and using polystyrene bead calibration standards.

Test Method 7: Particle Size Via Laser Diffraction

For a polymer dispersion (or latex) with average particle size larger than 1 micrometer, the average particle size was measured by laser diffraction with an HORIBA LA-950 LASER DIFFRACTION PARTICLE SIZE ANALYZER (Horiba Instruments, Inc., Kyoto, Japan) with a diluted latex sample (approximately 1:5 weight ratio of polymer dispersion to 1% DS-10 surfactant solution in deionized water), following the manufacturer's instructions.

Test Method 8: 90° Peel Adhesion Test to Polypropylene Substrate

A sample of pressure-sensitive adhesive to be tested was coated with a hand-spread knife onto HOSTAPHAN 3SAB primed PET film and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for about 24 hours, and then cut into strips of tape that were 0.5 inch (approximately 1.3 cm) wide.

Polypropylene (PP) test panels ("PP testing panel_1") were 5 cm×12.5 cm panels obtained from Aeromat Plastics (Burnsville, Minn., USA) and were prepared by wiping the panels 8 to 10 times using hand pressure with a tissue wetted with the isopropyl alcohol. The procedure was repeated two more times with clean tissues wetted with isopropyl alcohol. The cleaned panels were air dried.

To do the PP peel adhesion test, first the 0.5 inch (1.25 cm) wide strip of tape was applied to the PP substrate with a 2 kilograms (4.5 pounds) roller. Then the peel test was performed at a removal angle of 90 degrees according to the procedure described in the ASTM International standard D3330/D3330M-04 (reproved in 2010), Method F.

Peel adhesion was assessed with an IMASS SP-2000 slip/peel tester (available from IMASS, Inc., Accord, Mass., USA) at a peel rate of 305 mm/minute (12 inches/minute). Peel adhesion values were reported as both ounces per inch (oz/in) and Newtons per decimeter (N/dm).

Test Method 9: 180° Peel Adhesion Test to Stainless Steel Substrate

A sample of pressure-sensitive adhesive to be tested was coated with a hand-spread knife onto HOSTAPHAN 3SAB primed PET film, and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for 24 hours, and then cut into strips of tape that were 0.5 inch (approximately 1.3 cm) wide.

The 0.5 inch (approximately 1.3 cm) wide strips of tape were applied to a stainless steel (SS) plate with a 2 kg (4.5 pound) roller and then peel adhesion was assessed with an IMASS SP-2000 slip/peel tester (available from IMASS, Inc. (Accord, Mass., USA)) using a peel angle of 180 degrees and speed of 12 inches (approximately 30 cm) per minute. Peel adhesion values were reported as both ounces per inch (oz/in) and Newtons per decimeter (N/dm).

Test Method 10: Static Shear Strength at 70° C.

A sample of pressure-sensitive adhesive to be tested was coated with a hand-spread knife onto HOSTAPHAN 3SAB primed PET film, and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for 24 hours, and then cut into strips of tape 0.5 inch (approximately 1.3 cm) wide.

The static shear strength of an adhesive was determined according to ASTM International standard, D3654/D3654M-06 (reapproved in 2011)—Procedure A, using a 500 grams load inside an oven set at 70° C. A test specimen was prepared by laminating a 0.5 in.×1 in. (1.3 cm×2.5 cm) piece of adhesive or tape on a polypropylene (PP) or stainless steel (SS) panel. The time to failure (i.e., the time for the weight to pull the adhesive away from panel in minutes) was recorded. If no failure was observed after 10,000 minutes, the test was stopped and a value of 10,000+ minutes was recorded.

Testing Method 11: Peel Creep Holding Strength Testing

A sample of pressure-sensitive adhesive to be tested was coated with a hand-spread knife onto HOSTAPHAN 3SAB primed PET film, and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for 24 hours, and then cut into strips of tape 1 inch (approximately 2.5 cm) wide.

The test specimen was prepared by laminating one of the strips of tape to a polypropylene or stainless steel test panel with a 2.0 kg (4.5 lb.) rubber roller. The contact area of the adhesive on the panel was 2.5 cm by 2.5 cm (1 inch×1 inch). The test specimen was then hung 180° peel vertically downwards with the weight of 100 grams, in an oven set at 70° C. The hanging time was recorded by a timer. If no failure was observed after 10,000 minutes, the test was stopped and a value of 10,000+ minutes was recorded.

Testing Method 12: Fabric Bonding Adhesion

The fabric, which was a sport nylon (obtained from Joann Fabrics as item number 1997147, royal blue color) was cut into 1 inch (about 2.5 cm) wide and 6 inch (15.2 cm) long strips. The adhesive tape was cut into 0.5 inch (1.3 cm) wide and 7-8 inches (18 to 20 cm) long strips. The tape strip was laid on the fabric strip. This testing sample was laminated together with a 2 kg (4.5 lb.) roller, and then dwelled for 1 hour before testing. The end of fabric was then placed in the bottom jaw of an INSTRON device and the end of tape in the top jaw. The INSTRON settings were set as follows: crosshead speed of 12 inch/min (30.5 cm/min), and average load was taken between 2 inch (5.1 cm) and 5 inch (12.7 cm), which part was the middle portion of the sample. Three readings were recorded, averaged and reported as the peel adhesion.

Preparatory Example 1 (PE-1)

A polymer was made using a two-step process. In the first step of the polymerization, the reactor (an agitated stainless steel reactor) was charged with a mixture consisting of 88 kg of IBOA and 2.72 kg of acrylic acid (AA), along with 90.8 grams of IRGANOX 1010, 381 grams of IOTG, 18.2 grams of MEHQ, and 1.8 grams of VAZO 52. The reactor was sealed and purged with nitrogen and then held at approximately 5 psig (34.5 kPa) nitrogen pressure. The reaction mixture was heated to 60° C. (140° F.) and the reaction proceeded adiabatically and peaked at a temperature of 127° C. (260° F.). When the reaction was complete, the mixture was cooled to below 50° C.

In the second step, to the reaction product of the first step was added 10.9 grams of VAZO 52, 3.6 grams of VAZO 67, 5.4 grams of VAZO 88, 5.4 grams of LUPERSOL 101, and 7.3 grams of LUPERSOL 130 (the initiator components were added as a solution dissolved in a small amount of ethyl acetate). An additional 191 grams of IOTG was then added. The reactor was sealed and purged with nitrogen and held at 5 psig (34.5 kPa) nitrogen pressure. The reaction mixture was heated to 60° C. (140° F.) and the reaction proceeded adiabatically. After the reaction reached peak temperature of 176° C. (350° F.), the mixture was heated at this temperature for 2 hours. The resulting polymeric material is referred to as PE-1. To get PE-1 out of the reactor, the heating jacket was drained and EHA was added over a period of 2 hours. The resulting polymer solution, which contained PE-1 dissolved in the added EHA, was then cooled to 93° C. (200° F.) and stirred overnight.

As used herein, the term "PE-1" refers to the polymeric material formed from IBOA/AA (97/3) and having a weight average molecular weight of 35 kg/mole. All formulations below using PE-1 are based on the weight of the polymer rather than on the weight of the polymer solution formed by dissolving PE-1 in EHA. The EHA added to form the polymer solution is considered to be part of the first monomer composition.

Preparatory Example 2 (PE-2)

In a first step of the polymerization, a 5 liter stainless steel reactor was charged with a 2 kg mixture consisting of 300 grams of IOA, 1600 grams of IBOA, and 100 grams of AA, along with 2 grams of IRGANOX 1010, 50 grams of IOTG, 0.4 grams of MEHQ, and 0.12 grams of VAZO 52. The reactor was sealed, purged of oxygen with nitrogen, and then held at approximately 5 psig (approximately 34 kPa) nitrogen pressure. The reaction mixture was heated in the first step to 60° C. and the reaction proceeded adiabatically. The temperature peaked at 149° C. When the reaction was complete, the mixture was cooled to below 50° C.

A solution of various initiators (0.36 grams of VAZO 52, 0.08 grams of VAZO 67, 0.12 grams of VAZO 88, 0.12 grams of LUPERSOL 101, and 0.16 grams of LUPERSOL 130) dissolved in minimal amount ethyl acetate, and 25 grams of IOTG were then added to the reaction product of the first step. The reactor was sealed and purged of oxygen with nitrogen, and then held at 5 psig (approximately 34 kPa) nitrogen pressure. The reaction mixture was heated to 60° C. and the reaction proceeded adiabatically. After the reaction reached peak temperature of 120° C., the mixture was heated to 180° C. for 2 hours and drained, while hot, into aluminum trays. After the material cooled, the resulting solid polymer was hammered into flakes. The resulting polymer had a composition of IOA/IBOA/AA of 15/80/5 and $M_W$ of about 7.3 kg/mol.

Preparatory Example 3 (PE-3)

The polymer solution containing PE-1 dissolved in EHA was blended with that from PE-2 such that the weight ratio of PE-1 polymer to PE-2 polymer was 7:3. The polymeric material had IBOA as its main component and a weight average molecular weight of 18 kg/mol.

Any further example referring to PE-3 means the above described mixture of PE-1 and PE-2 where PE-1 does not include the EHA needed to remove this polymeric material from the reactor. Any EHA combined with PE-1 is considered to be part of the first monomer composition. Preparatory Example 4 (PE-4)

First, an IBOA/AA (97/3) copolymer with $M_W$ about 34 kg/mol was prepared by a bulk polymerization within a polymeric pouch initiated by ultra-violet radiation according to the method described in Patent Application Publication WO 96/07522 and U.S. Pat. No. 5,804,610 (Hamer et al.). The photo initiator used was IRGACURE 651. The polymer was made from IBOA (97 pph) and AA (3 pph) based on the total weight of monomers. IRGACURE 651 (1 pph) and IOTG (0.75 pph) were added based on the total weight of monomers.

Then, 50 grams toluene, 50 grams of the polymer, 0.64 grams TRITON X-100, and 0.115 grams of DS-4 were mixed together to form an oil phase. 25 grams water and 0.115 grams of DS-4 were mixed together to form an aqueous phase. The aqueous phase and oil phase were mixed together well in a beaker, and then the resulting mixture was transferred to a 1 L stainless steel Waring blender container. The mixture was blended at high speed setting for 2 minutes to give a polymer emulsion having a solids content of 40 wt. %. The average particle diameter was about 2.9 micrometers.

Samples PE-1 to PE-4 had $M_W$ and $T_g$ values as summarized in Table 2.

TABLE 2

| Sample | Composition | $M_w$ (kg/mol) | $T_g$ (° C.) |
|---|---|---|---|
| PE-1 | IBOA/AA (97/3) | 35 | 95* |
| PE-2 | IOA/IBOA/AA (15/80/5) | 7.3 | 60 |
| PE-3 | PE-1/PE-2 (70/30) | 18 | 84 |
| PE-4 | IBOA/AA (97/3) | 34 | 94 |

In Table 2, the glass transition temperature shown with an asterisk was measured using DSC, and the others were calculated from the FOX equation.

Emulsified REGLAREZ 1126

30 grams of toluene, 70 grams of REGALREZ 1126, 0.90 grams of TRITON X-100, and 0.16 grams of DS-4 were mixed together to form an oil phase solution. Then, 25 grams water and 0.16 grams of DS-4 were mixed together to form an aqueous phase solution. The aqueous phase solution was then transferred to a 1 L stainless steel Warring blender, followed by the oil phase solution. The mixture was blended at high speed setting for 2 minutes to give a polymer emulsion, having a solids content of 57 wt. % and an average particle diameter of 4.9 micrometers.

Preparation of a Short-Wave UV-Cured Liner

A blend of 70 weight percent TEGO RC-902 and 30 weight percent TEGO RC-711 was coated onto one side of a 50 micrometer thick unprimed PET film substrate (available from Mitsubishi Polyester Film, Inc. (Greer, S.C., USA)) to give a wet coating thickness of less than 1.0 micrometer. The coated film was then exposed to the output of three 150 W low-pressure mercury amalgam lamps (manufactured by Heraeus Noblelight (Hanau, Germany)) with a peak intensity at 185 nm in a nitrogen atmosphere and at a web speed of 15.2 meters per minute (mpm) to provide a short-wave UV-cured liner having a cured release surface. Other information about this liner can be found in U.S. Patent Application Publication No. 2013/0059105 (Wright et al.).

Example 1 (EX-1): Latex Formed from EHA/IBOA/AA/MAA/PE-1/REGALREZ 1126 (84/13/2/1/3/7)

The water phase was prepared by mixing and stirring 15.6 grams of HITENOL BC1025 and 208 grams of deionized water in a beaker to form an aqueous solution. 249.6 grams of EHA, 37.9 grams IBOA, 5.3 grams of AA, 3.5 grams of MAA, 8.9 grams of the second (meth)acrylate polymer PE-1 and 20.7 grams REGALREZ 1126 tackifier were added to a beaker and mixed well to form an oil phase having a total weight of 326 grams. For further clarification, PE-1 refers to the polymer formed from IBOA/AA (97/3). The amount of EHA included in the polymer solution containing dissolved PE-1 (the amount of EHA added to remove PE-1 from the reactor in which it was prepared) was included in the total amount of EHA added (249.6 grams total). The oil phase and aqueous phase were then mixed together well in a beaker. The content was poured into a 1-liter stainless steel Warring blender container, and homogenized at high speed setting for 2 minutes. The resulting pre-emulsion was poured into a 2-liter resin flask equipped with a thermometer, mechanical agitation with glass retreat blade impeller, condenser and nitrogen inlet tube, and 0.39 g of potassium persulfate was then added (the ratio of initiator/total monomers was 0.13%). The reaction mixture was stirred under nitrogen blanket and heated to 60° C. and maintained at 60° C. for 4 hours. The temperature was then increased to 80° C. within 30 minutes and maintained at this temperature for 1 hour.

The latex was then cooled and filtered through cheesecloth. The latex had 59 wt. % solids, a viscosity of 914, and an average particle diameter of 405 nm. The pH of the latex was about 2.8.

The latex had a single glass transition temperature at about −45° C. The modulated DSC heat flow signals from the second heating (2H) cycle for EX-1 as a function of temperature in a nitrogen atmosphere was as shown in FIG. 1.

Comparative Example 1 (CE-1): Latex Formed from EHA/IBOA/AA/MAA/PE-1 (84/13/2/1/3)

This latex was made according to the procedure for EX-1 except that no REGALREZ 1126 tackifier was used in the oil phase. The total amount of oil phase was the same as that of EX-1 (326 grams), except that the weight of each oil phase component was adjusted according to the oil phase composition of EHA/IBOA/AA/MAA/PE-1 (84/13/2/1/3).

The amount of initiator was also adjusted according to the weight of total monomers in order to achieve the same weight ratio of initiator/total monomer mixture as in EX-1 (i.e., 0.13%).

The resulting latex had solids content of 61 wt. % and average particle diameter of 392 nm. The pH of the latex was about 2.8. The glass transition temperature was about −48° C.

Comparative Example 2 (CE-2): atex Formed from EHA/IBOA/AA/MAA/REGALREZ 1126 (84/13/2/1/7)

This latex was made according to the procedure for EX-1 except that no second (meth)acrylate polymer was used in the oil phase. The total amount of oil phase was the same as that of EX-1 (326 grams), but the weight of each oil phase component was adjusted according to the oil phase composition of EHA/IBOA/AA/MAA/REGALREZ 1126 at the following weight ratio: 84/13/2/1/7.

The amount of initiator was also adjusted according to the weight of total monomer in order to achieve the same weight ratio of initiator/total monomers as in EX-1 (i.e., 0.13%). After polymerization, the latex pH was adjusted to about 4 with 30% ammonia. The resulting latex had a solids content of 60 wt. %. The average particle diameter was about 399 nm.

TABLE 3

Composition of EX-1, CE-1, and CE-2

| Example | Composition | Average Latex particle size, nm | $T_g$, °C. |
|---|---|---|---|
| EX-1 | EHA/IBOA/AA/MAA/PE-1/ REGALREZ 1126 (84/13/2/1/3/7) | 405 | −45* |
| CE-1 | EHA/IBOA/AA/MAA/PE-1 (84/13/2/1/3) | 392 | −47* |
| CE-2 | EHA/IBOA/AA/MAA/REGALREZ 1126 (84/13/2/1/7) | 399 | −45 |

In Table 3, the glass transition temperatures ($T_g$) shown with an asterisk was measured using DSC while the others were calculated from the FOX equation.

TABLE 4

Adhesive Properties of EX-1, CE-1, and CE-2

| Example | Peel - SS, oz/in (N/dm) | Peel - PP, oz/in (N/dm) | 70° C. Shear on SS, minutes | 70° C. Shear on PP, minutes |
|---|---|---|---|---|
| EX-1 | 54 (59) | 38 (42) | 10000 | 10000 |
| CE-1 | 53 (58) | 25 (27) | 10000 | 10000 |
| CE-2 | 43 (47) | 38 (42) | 10000 | 492 |

In Table 4, the peel strength was measured according to Test Methods 8 and 9 while the shear strength was measured according to Test Method 10.

Comparative Example 3 (CE-3): Blend of CE-1 and Emulsified REGALREZ 1126

Comparative Example 3 was prepared by blending the latex CE-1 with emulsified REGALREZ 1126 prepared as described above. CE-1 was formed from EHA/IBOA/AA/ MAA/PE-1 (84/13/2/1/3) and did not contain a tackifier. The amounts of the emulsified REGALREZ 1126 (1.79 grams having 57 wt. % solids) and CE-1 (25 grams having 61 wt. % solids) were adjusted so that the resulting mixture (i.e., CE-3) had the same overall composition as EX-1.

While the overall composition of CE-3 was the same as EX-1, the location of the tackifier was different. Unlike EX-1, the CE-3 did not have the tackifier and the second (meth)acrylate copolymer within the same particle. More specifically, the tackifier, the second (meth)acrylate polymer, and the polymerized product of the first monomer mixture were within the same particles for EX-1. In contrast, CE-3 contained some particles containing both the polymerized product of the first monomer mixture and the second (meth)acrylate polymer and other particles containing the tackifier.

Comparative Example 4 (CE-4): Blend of CE-2 and PE-4

Comparative Example 4 was prepared by blending a (meth)acrylate polymer dispersion (PE-4) with the latex of Comparative Example 2 (CE-2). PE-4 contained a dispersed (meth)acrylate polymer prepared from IBOA/AA (97/3) with Mw about 34 kg/mol. CE-2 was formed from EHA/ IBOA/AA/MAA/REGALREZ 1126 (84/13/2/1/7) and did not contain a second (meth)acrylate polymer. The amount of CE-2 (30 grams having 60 wt. % solids) and PE-4 (1.27 grams having 40 wt. % solids) were adjusted so that CE-4 had the same overall composition as EX-1.

While the overall composition of CE-4 was the same as EX-1, the location of the second (meth)acrylate polymer was different. More specifically, the tackifier, the second (meth) acrylate polymer, and the polymerized product of the first monomer mixture were within the same particles for EX-1. In contrast, CE-4 contained some particles containing both the polymerized product of the first monomer mixture and the tackifier and other particles containing the second (meth) acrylate polymer.

TABLE 5

Description and Adhesive Properties of EX-1, CE-3, and CE-4, which all had the same overall composition

| Sample | Description | Peel - SS, oz/in (N/dm) | Peel - PP, oz/in (N/dm) | 70° C. Shear on SS, minutes | 70° C. Shear on PP, minutes |
|---|---|---|---|---|---|
| EX-1 | Same latex particles contained the polymerized product of first monomer composition, the second (meth)acrylate polymer, and tackifier | 54 (59) | 38 (42) | 10000 | 10000 |
| CE-3 | Some latex particles contained both the polymerized product of the first monomer mixture and the second (meth)acrylate polymer while other particles contained the tackifier | 46 (51) | 27 (30) | 10000 | 841 |
| CE-4 | Some latex particles contained both the polymerized product of the first monomer mixture and the tackifier while other particles contained the second (meth)acrylate polymer | 36 (39) | 19 (21) | 10000 | 432 |

In Table 5, the peel strength was measured according to Test Methods 8 and 9 while the shear strength was measured according to Test Method 10.

Example 2 (EX-2): Latex formed from EHA/AA/MAA/PE-1/REGALREZ 1126 (97/2/1/10/7)

15.7 grams of HITENOL BC1025, 206.6 grams of deionized water, and 1.27 grams sodium phosphate dibasic were added into a beaker and stirred to form an aqueous solution. 268.7 grams of 2-ethylhexyl acrylate (EHA), 5.0 grams of acrylic acid (AA), 3.3 grams of methacrylic acid (MAA), 26.8 grams of Preparatory Example 1 (PE-1: composition of IBOA/AA (97/3) and Mw of 35 kg/mol), and 19.5 grams REGALREZ 1126 were added to a beaker and mixed well to form a solution, which was the oil phase having a total weight of 326 grams. The oil and aqueous phase were then mixed well in a beaker. The mixture was poured into a 1-liter stainless steel Warring blender container. The mixture was homogenized at high speed setting for 2 minutes then poured into a 2-liter resin flask equipped with a thermometer, mechanical agitator with glass retreat blade impeller, condenser, and nitrogen inlet tube. Then, 0.36 g of potassium persulfate was added. The reaction mixture was stirred under nitrogen blanket and heated to 60° C. and maintained at 60° C. for 4 hours. The temperature was then increased to 80° C. within 30 minutes and maintained at this temperature for 1 hour.

The latex was then cooled and filtered through cheesecloth to provide a latex having 59 wt. % solids, a viscosity of 104 centipoises, and average particle diameter of 554 nm. The pH was about 4.

Figure 2:
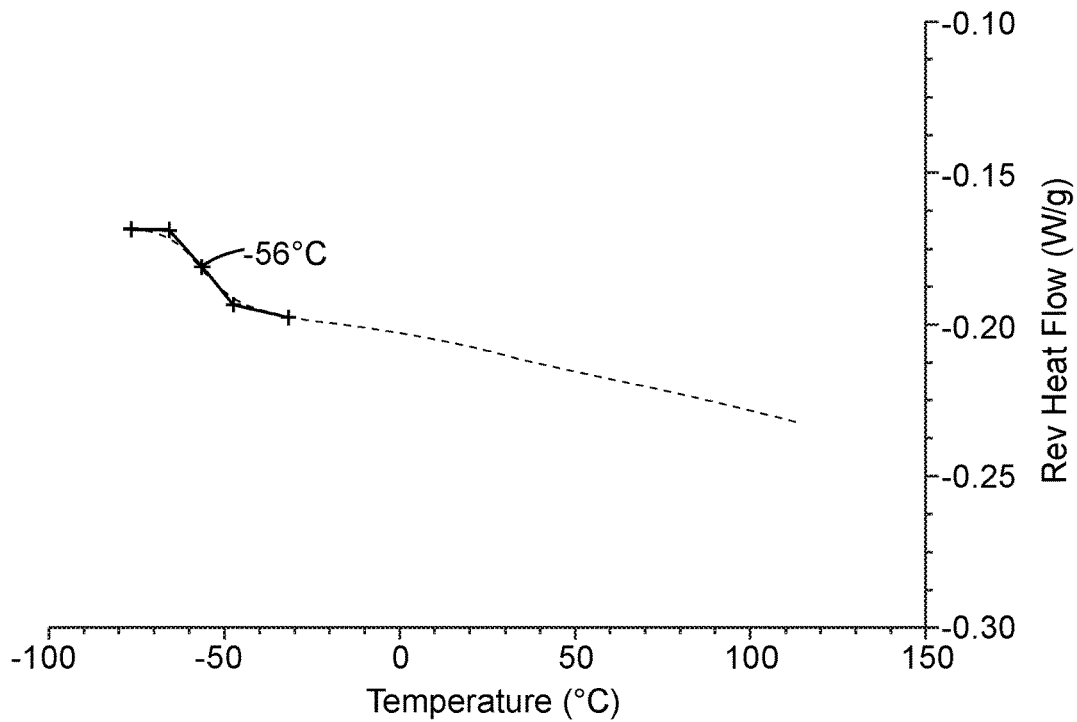
FIG. 2 is the Modulated Differential Scanning Calorimetry plot from the second heating (2H) cycle for the polymeric latex particles of Example 2. Heat flow is plotted as a function of temperature in a nitrogen atmosphere.

The polymer only had one glass transition temperature at about −56° C. The modulated DSC heat flow signals from the second heating (2H) cycle for EX-2 as a function of temperature in a nitrogen atmosphere was as shown in FIG. 2.

Example 3 (EX-3): Latex Formed from EHA/AA/MAA/PE-1/PE-2/REGALREZ 1126 (97/2/1/7/3/7)

Example 3 latex (EX-3) was made the same way as Example 2 (EX-2) except that a mixture of PE-1 and PE-2 was used in place of PE-1. The weight average molecular weight of the mixture of PE-1 and PE-2 was about 18 kg/mole. The weight ratio of PE-1 to PE-2 was 7:3 (this is equivalent to PE-3).

The latex had a viscosity of 132 centipoises and an average particle diameter of 612 nm. The pH was about 4. The glass transition temperature was about −56° C.

Example 4 (EX-4): Latex Formed from EHA/AA/MAA/PE-2/REGALREZ 1126 (97/2/1/10/7)

Example 4 was prepared the same way as Example 2 (EX-2) except that a different preformed polymer (i.e., Preparatory Example 2: PE-2) was used. In Example 4, the preformed polymer (PE-2) had a composition of IOA/IBOA/AA: 15/80/5 and Mw of 7.3 kg/mol.

The latex had a viscosity of 172 centipoises and average particle diameter of 516 nm. The pH was about 4. The glass transition temperature was about −52° C.

Comparative Example 5 (CE-5): Latex Formed from EHA/AA/MAA/REGALREZ 1126: 97/2/1/7)

Comparative Example 5 latex was made the same way as Example 2 (EX-2) except that no second (meth)acrylate polymer was used. The total amount of oil phase (326 grams) was the same as Example 2 (EX-2), but the weight of each oil phase component was adjusted accordingly. The initiator amount was also adjusted according to the weight of total monomer in order to achieve the same weight ratio of initiator/total monomer mixture (0.13%) as in EX-2.

The latex had 61 wt. % solids, a viscosity of 120 centipoises, and an average particle diameter of 566 nm. The glass transition temperature was about −56° C.

Comparative Example 6 (CE-6): Blend of CE-5 and PE-4

Comparative Example 6 was prepared by blending a (meth)acrylate polymer dispersion (PE-4) with the latex of Comparative Example 5 (CE-5). PE-4 contained a dispersed (meth)acrylate polymer prepared from IBOA/AA (97/3) with Mw of about 34 kg/mol. CE-5 was formed EHA/AA/MAA/REGALREZ 1126 (97/2/1/7) and did not contain a second (meth)acrylate polymer. The amount of PE-4 (4.3 grams having 60 wt. % solids) and CE-5 (30 grams having 61.4 wt. % solids) were adjusted so that CE-6 had the same overall composition as EX-2.

While the overall composition of CE-6 was the same as EX-2, the location of the second (meth)acrylate polymer was different. More specifically, the tackifier, the second (meth)acrylate polymer, and the polymerized product of the first monomer mixture were within the same particles for EX-2. In contrast, CE-6 contained some particles containing both the polymerized product of the first monomer mixture and the tackifier and other particles containing the second (meth)acrylate polymer.

TABLE 6

Description and Adhesive Properties for EX-2 to EX-4 and CE-5 to CE-6

| Sample | Description | Peel - SS, oz/in (N/dm) | Peel - PP, oz/in (N/dm) | 70° C. Shear on SS, minutes | 70° C. Shear on PP, minutes | 70° C. Creep on SS, minutes | 70° C. Creep on PP, minutes |
|---|---|---|---|---|---|---|---|
| EX-2 | EHA/AA/MAA/PE-1/REGALREZ 1126 (97/2/1/10/7) | 54 (59) | 35 (38) | 10000 | 10000 | 10000 | 10000 |
| EX-3 | EHA/AA/MAA/PE-1/PE-2/REGALREZ 1126 (97/2/1/7/3/7) | 58 (64) | 36 (39) | 10000 | 9275 | 10000 | 6648 |
| EX-4 | EHA/AA/MAA/PE-2/REGALREZ 1126 (97/2/1/10/7) | 70 (77) | 40 (44) | 10000 | 315 | 10000 | 10 |

TABLE 6-continued

Description and Adhesive Properties for EX-2 to EX-4 and CE-5 to CE-6

| Sample | Description | Peel - SS, oz/in (N/dm) | Peel - PP, oz/in (N/dm) | 70° C. Shear on SS, minutes | 70° C. Shear on PP, minutes | 70° C. Creep on SS, minutes | 70° C. Creep on PP, minutes |
|---|---|---|---|---|---|---|---|
| CE-5 | EHA/AA/MAA/ REGALREZ 1126 (97/2/1/7) | 45 (49) | 38 (41) | 10000 | 467 | 10000 | 5 |
| CE-6 | Blend of CE-5 and PE-4 | 20 (22) | 14 (16) | 10000 | 327 | N/A | 4 |

In Table 6, Peel was measured according to Test Methods 8 and 9. Shear was measured according to Test Method 10 and Creep was measured according to Test Method 11.

The combination of PE-1 and PE-2 in EX-3 is equivalent to PE-3.

Example 5 (EX-5): PSA Formed from Latex EX-2

Example 2 (EX-2) latex was coated with hand-spread knife coater on 1 mil polyester film and dried in 70° C. oven for 20 minutes to give dry adhesive thickness of 2 mil (0.002 inches, about 51 micrometers). After being conditioned in a constant temperature and humidity (23° C. and 50% relative humidity) room for 24 hours, the PSA was used for fabric adhesion test. The fabric bonding peel adhesion was measured according to Test Method 12. The fabric bonding peel adhesion was 9.9 oz/in (10.8 N/dm).

Example 6 (EX-6): Preparation and Characterization of Transfer Tape

First, about 30 grams EX-2 latex was mixed with about 0.7 wt. % PARAGUM 500 based on the weight of the EX-2 latex. Then the pH was adjusted to 7. The polymeric latex blend was then coated with a hand-spread knife coater onto the cured release surface of a sample of the Short-Wave UV-Cured Liner (the description for preparation of this liner is above). The coating was dried in a 70° C. oven for 20 minutes to give a "transfer tape" having a pressure-sensitive adhesive layer with a dry thickness of about 2 mil (about 51 micrometers).

The resulting article was a "transfer" tape that was then aged and/or conditioned under one of the three following conditions:

Condition 1: 23° C. at 50% relative humidity for 24 hours.
Condition 2: 23° C. at 50% relative humidity for 24 hours, followed by 32° C. at 90% RH for 48 hours, and then equilibrating for 1 hour at 23° C. at 50% relative humidity.
Condition 3: 23° C. at 50% relative humidity for 24 hours, followed by heating in a 70° C. oven (humidity not controlled) for 48 hours, and then equilibrating for 1 hour at 23° C. at 50% relative humidity.

After the conditioning step, a 25 micrometer (1.0 mil) primed PET film was laminated to the conditioned latex PSA layer to form laminated test samples. The primed PET film was prepared by application of a sol-gel primer as described in Japanese Patent J02200476-A.

The peel adhesion value was a measure of the force required to pull the PET-backed adhesive tape from the short-wave UV-cured liner at an angle of 180° at a rate of 30.5 cm/min (12 inches/minute). The IMASS MODEL SP2000 PEEL TESTER (IMASS Corp., Accord, Mass.) was used to record the peel adhesion value, summarized as "Release" value in Table 7.

To determine the re-adhesion value, PET-backed tape samples were peeled from the short-wave UV-cured liner as described above and then applied to the surface of a clean stainless steel panel. The PET-backed tape sample was rolled down against the panel by means of two passes with a 2 kg rubber roller at 61 cm/min (24 inches/min). The re-adhesion value was a measure of the force required to pull the PET-backed tape from the steel surface at an angle of 180° at a rate of 30.5 cm/min (12 inches/minute). The IMASS MODEL SP2000 PEEL TESTER was used to record the peel force, summarized as "Re-adhesion" value in Table 7.

TABLE 7

Release and Re-adhesion of EX-6

| | Condition 1 | | Condition 2 | | Condition 3 | |
|---|---|---|---|---|---|---|
| Sample | Release, g/in (g/cm) | Re-adhesion, oz/in (N/dm) | Release, g/in (g/cm) | Re-adhesion, oz/in (N/dm) | Release, g/in (g/cm) | Re-adhesion, oz/in (N/dm) |
| EX-6 | 10.9 (4.3) | 31.3 (34.3) | 9.2 (3.6) | 29.6 (32.4) | 17.7 (7.0) | 31.6 (34.6) |

Example 7 (EX-7)

Latex Formed from 2EHA/IBOA/AA/MAA/PE-1/REGAREZ 1126 (86/11/2/1/11/8)

27.2 grams of HITENOL BC1025, 359 grams of deionized water, and 2.2 grams sodium phosphate dibasic ($Na_2HPO_4$) were added into a beaker and stirred to form an aqueous solution. 407 grams of 2-ethylhexyl acrylate (EHA), 8.5 grams of acrylic acid (AA), 5.6 grams of methacrylic acid (MAA), 55.5 grams isobornyl acrylate (IBOA), 39.5 grams REGAREZ 1126, and 52.6 grams of the second (meth)acrylate polymer from Preparatory Example 1 (PE-1) were added to a beaker and mixed well to form a solution, which was the oil phase and had a total weight of 566 grams. The oil and aqueous phase were then mixed well in a beaker. Half of the mixture was poured into a 1-liter stainless steel Warring blender container, and was homogenized at high speed setting for 2 minutes. The other half of the mixture was also high shear mixed in the same way. The homogenized emulsion was then poured into a 2-liter resin flask equipped with a thermometer, mechanical agitator with glass retreat blade impeller, condenser and nitrogen inlet tube. Then 0.41 grams of potassium persulfate (KPS) and 4 grams of water were added. The reaction mixture was stirred under a nitrogen blanket, heated to 60° C., and maintained at 60° C. for 4 hours. The temperature was then increased to 80° C. within 30 min and maintained at this temperature for 1 hour.

The latex was then cooled and filtered through cheesecloth to give a latex adhesive having 58 wt. % solids, pH of 4.3, viscosity of 104 centipoises, and an average particle diameter of 540 nm.

Example 7 (EX-7) latex was then coated onto HOSTAPHAN 3SAB primed PET film to provide a dry PSA thickness of about 1 mil (0.001 inches, 0.0025 cm). The PSA was then tested according to Test Methods 8 and 9 for peel adhesion, according to Test Method 10 for shear strength, and according to Test Method 11 for Creep. The PSA performance is shown in Table 8.

TABLE 8

Adhesive Properties of EX-7

| Sample | Description | Peel - PP, oz/in (N/dm) | 70° C. Shear on PP, minutes | 70° C. Creep on PP, minutes |
|---|---|---|---|---|
| EX-7 | 2EHA/IBOA/AA/MAA/ PE-1/REGAREZ 1126 (86/11/2/1/11/8) | 34 (37) | 9465 | 10000 |

Example 8 (EX-8): Preparation of Transfer Tape and Acrylic Foam Tape

Example 7 (EX-7) latex was coated on 3M 200MP liner with a hand-spread knife coater, and then dried in 70° C. oven for 20 minutes to give a dry PSA of about 2 mil (about 51 micrometers). The PSA on 3M 200MP liner was cooled to room temperature, and then covered with the low adhesion backside of a biaxially oriented polypropylene (BOPP) film (3M), which served as the second liner. In the resulting article, the 3M 200MP liner was easier to remove than the BOPP film. This transfer tape (adhesive and liner assembly) was conditioned in a constant temperature and humidity (23° C., 50% relative humidity) room for about 1 week, before being used to make an acrylic foam tape.

An acrylic foam tape was made by peeling the 3M 200MP liner off the transfer tape (the adhesive and liner assembly) and then laminating the exposed pressure-sensitive adhesive to the unlined side (the side without a release liner) of 3M Acrylic Foam Tape 5314. Before laminating, the unlined side of the 3M Acrylic Foam Tape 5314 was primed with 3M 4298UV adhesion promoter according to manufacturer's instructions. The resulting foam tape had different adhesives: the pressure-sensitive adhesive of EX-8 on one side and the original 3M acrylic foam tape 5314 adhesive on the other side.

The EX-8 adhesive on the above mentioned foam tape was tested for 90 Degree Peel Adhesion to the various test surfaces by the following procedure. A specimen was prepared by adhering 0.5 inch×4.5 inch wide strip of the foam tape with the laminated experimental (EX-8) adhesive against the test surface, and with the second (original 5314) adhesive surface of the foam tape against a 0.75 inch by 4.5 inch wide strip of anodized aluminum foil. The test assembly was pressurized using a 6.6 kg steel roller and left at room temperature for 24 hours before testing. The test was run on an INSTRON MODEL 5565 tensile tester (Instron Corporation, Norwood, Mass.) by pulling the aluminum foil and tape away from the test substrate panel at a 90 degree angle at a rate of 12 inches/minute. Two replicates of each sample were tested. Test results are recorded in pounds per 0.5 inch (lbs/0.5 in) and converted to Newtons/dm (N/dm).

TABLE 9

Peel Strength of EX-8 Acrylic Foam Tape on various substrates

| 3131 TPO, lbs/0.5 in (N/dm) | GM TPO, lbs/0.5 in (N/dm) | PP testing panel 2, lbs/0.5 in (N/dm) | ABS, lbs/0.5 in (N/dm) | MAC 8000, lbs/0.5 in (N/dm) | SHRE, lbs/0.5 in (N/dm) |
|---|---|---|---|---|---|
| 7.8 (273) | 7.3 (256) | 5.7 (200) | 5.4 (189) | 3.2 (112) | 4.7 (165) |

Example 9 (EX-9): Polyolefin Foam Tape

First, the polyolefin foam (5AS) was surface treated with plasma. The plasma treatment was carried out to create nanostructure on the surface of the foam using an apparatus for roll-to-roll treatment as described in pending patent application WO 2011/139593A1 (David et al.). A roll of foam was loaded into the apparatus, the chamber pumped down to its base pressure, and a mixture of hexamethyldisiloxane vapor and oxygen gas was used to create the nanostructure using conditions summarized below:

Base Pressure: 1 mTorr (0.13 Pa)
Oxygen Flow Rate: 500 standard $cm^3$/min
Hexamethyldisiloxane Vapor Flow Rate: 20 standard $cm^3$/min
Pressure: 9.7 mTorr (1.3 Pa)
Rf Power: 5000 watts
Line Speed: 10 ft/min (3.0 meters/min)

After the plasma treatment of the foam, the roll of foam was taken out of the chamber and used as backing to make foam tape.

Latex from Example 2 (EX-2) was coated on the surface treated polyolefin foam (5AS) with a box coater; then the corresponding item was dried in a 70° C. oven for 20 minutes to give a dry pressure-sensitive adhesive layer with thickness about 2 mil (0.002 inches, 0.005 cm). After cooling to room temperature, the pressure-sensitive adhesive was covered with a release liner that was prepared as described below.

The release liner was prepared by adding 100 grams of a vinyl terminated silicone base polymer with viscosity of 200 cps, available under the trade designation "SILMER VIN200" from Siltech Corporation (Toronto, Ontario, Canada) to 2.5 grams of a hydride functional crosslinker component (available from Dow Corning Corp., Midland, Mich., under the trade designation "SYL-OFF 7488").

These materials were mixed with 135 ppm of a platinum catalyst (Karstedt's catalyst, which is a platinum(0)-1,3-divinyl-1,1,3,3-tetramethyldisiloxane complex, available from Sigma-Aldrich, St. Louis, Mo., USA), 0.2 weight percent diallyl maleate inhibitor, and heptane/MEK solvents (80/20 ratio) to obtain a solution having 20 weight percent solids. The mixture was mixed thoroughly. The resulting formulation was coated onto HOSTAPHAN 3SAB primed PET film, using a gravure coater with a 200 QCH pattern gravure roll at a line speed of 90 ft/min (27.4 m/min), and dried and cured in an in-line oven set at 250° F. (121° C.) with a residence time of 20 sec to obtain well cured coatings. The silicone coat weight, measured with XRF, was 5.0 grams/m$^2$.

Then EX-2 latex was coated on the other side of the polyolefin foam with the box coater. The item was then dried at 70° C. oven for 20 minutes with the newly formed pressure-sensitive adhesive uncovered. The second pressure-sensitive adhesive layer was also about 2 mil (0.002 inches, 0.005 cm) thick. This foam tape assembly was then conditioned at a constant temperature and humidity (23° C., 50% relative humidity) room for about 24 hours before adhesive performance testing.

with a contact area of 0.5 inch×1 inch (1.3 cm×2.5 cm), and then peeling the release liner from the other side of the foam tape and putting a 0.5 inch (1.25 cm) wide and 2 mil (0.002 inches, 0.005 cm) thick PET backing on the adhesive. The whole foam tape and substrate unit was laminated together with a 2 kg roller. The time to failure, i.e., time for the weight to pull the adhesive away from the panel in minutes was recorded. If no failure was observed after 10,000 minutes, the test was stopped and a value of 10,000+ minutes was recorded.

For peel creep testing, the test specimen was prepared by sticking the open face of a 2.5 cm (1 inch) wide polyolefin foam tape to a polypropylene or stainless steel test panel and then peeling off the release liner and putting a 2 mil PET backing on the adhesive. The whole polyolefin foam and substrate assembly was then laminated together with a 2.0 kg (4.5 lbs.) rubber roller. The contact area of the adhesive on the panel was 2.5 cm by 2.5 cm (1 inch×1 inch). The test specimen was then hung 180 degree peel vertically downwards with the weight of 100 grams, in an oven set at 70° C. The hanging time was recorded by a timer. If no failure was observed after 10,000 minutes, the test was stopped and a value of 10,000+ minutes was recorded.

Test results for Example 9 were as summarized in Table 10.

TABLE 10

| Test results for Example 9 | | | | | |
|---|---|---|---|---|---|
| SS peel, oz/in (N/dm) | PP peel, oz/in (N/dm) | 70° C. Shear - SS, (minutes) | 70° C. Shear - PP, (minutes) | 70° C. Peel Creep - SS, (minutes) | 70° C. Peel Creep PP, (minutes) |
| 172 (190) | 158 (174) | 10,000 | 10,000 | 10,000 | 7,311 |

The foam tape assembly was cut into a 0.5 inch wide strip and the uncovered PSA side was adhered to a polypropylene substrate. Then the release liner was peeled off the foam tape, and a 0.75 inch by 4.5 inch strip of anodized aluminum foil was put on to the adhesive. The resulting foam tape and substrate unit was laminated together with a 2 kg roller. The peel test was performed at a removal angle of 90° according to the procedure described in the ASTM International standard D3330, Method F. The test was conducted on an IMASS SP-2000 slip/peel tester (available from IMASS, Inc., Accord, Mass., USA) at a peel rate of 305 mm/minute (12 inches/minute). Peel adhesion values were reported as both ounces per inch (oz/in) and Newtons per decimeter (N/dm), as summarized in Table 10.

The foam tape assembly was cut into another 0.5 inch wide strip and the uncovered PSA side was adhered to a polypropylene substrate. Then the release liner was peeled off the foam tape, and a 0.75 inch by 4.5 inch wide strip of anodized aluminum foil was put on the adhesive. The resulting foam tape and substrate unite was laminated together with a 2 kg roller. Then the peel adhesion was assessed with a IMASS SP-2000 slip/peel tester (available from IMASS, Inc., Accord, Mass., USA) using a peel angle of 180 degrees and speed of 12 inches (approximately 30 cm) per minute. Peel adhesion values were reported as both ounces per inch (oz/in) and Newtons per decimeter (N/dm). The results were as summarized in Table 10. The static shear strength of the polyolefin foam tape was determined according to ASTM International standard, D3654, Procedure A, using a 500 gram load inside an oven set at 70° C. A test specimen was prepared by sticking the adhesive side of a polyolefin foam tape prepared above on a PP or SS panel

We claim:

1. An emulsion composition comprising:
   a) water;
   b) a polymerizable surfactant having an unsaturated group that can undergo free radical polymerization;
   c) a first monomer composition comprising
      1) an alkyl (meth)acrylate having a linear or branched alkyl group with at least six carbon atoms; and
   d) a second (meth)acrylate polymer in an amount of 0.5 to 15 weight percent based on a total weight of monomers in the first monomer composition, wherein the second (meth)acrylate polymer has a $T_g$ greater than or equal to 50° C. and wherein the second (meth)acrylate polymer is formed from a second monomer composition comprising
      1) at least 50 weight percent of a cyclic alkyl (meth)acrylate based on a total weight of monomers in the second monomer composition, wherein the cyclic alkyl group has at least six carbon atoms;
   e) a hydrogenated hydrocarbon tackifier;
   wherein
      the emulsion has a first phase comprising the water and a second phase dispersed as droplets within the first phase; and
      the droplets comprise a mixture comprising
         i) the second (meth)acrylate polymer; and
         ii) at least 90 weight percent of the first monomer composition, wherein the second (meth)acrylate polymer is not miscible with the first phase and is dissolved in the first monomer composition within the droplets; and
         iii) the hydrogenated hydrocarbon tackifier.

2. The emulsion composition of claim 1, wherein the first monomer composition further comprises a cyclic alkyl (meth)acrylate, a polar monomer, or both.

3. The emulsion composition of claim 1, wherein the first monomer composition comprises 60 to 99 weight percent of the alkyl (meth)acrylate having a linear or branched alkyl group with at least six carbon atoms, 0 to 30 weight percent of a cyclic alkyl (meth)acrylate, and 1 to 10 weight percent of the polar monomer.

4. The emulsion composition of claim 1, wherein the second monomer composition comprises 50 to 100 weight percent of a cyclic alkyl (meth)acrylate and 0 to 50 weight percent of an optional monomer that is a polar monomer, an alkyl (meth)acrylate having a linear or branched alkyl group, and a vinyl monomer that does not have a (meth)acryloyl group, (meth)acrylamide, (meth)acrylonitrile, an N-alkyl (meth)acrylamide, N,N-dialkyl (meth)acrylamide, or a mixture thereof.

5. The emulsion composition of claim 1, wherein the second monomer composition comprises 90 to 100 weight percent of the cyclic alkyl (meth)acrylate and 0 to 10 percent polar monomer.

6. The emulsion composition of claim 1, wherein the first monomer composition is different than the second monomer composition.

7. The emulsion composition of claim 1, wherein the second (meth)acrylate polymer has a weight average molecular weight in a range of 10,000 to 150,000 grams/mole.

8. The emulsion composition of claim 1, wherein the hydrogenated hydrocarbon tackifier is present in an amount in a range of 1 to 40 weight percent based on a total weight of monomers in the first monomer composition and the weight of the second (meth)acrylate polymer.

9. A latex composition comprising a polymerized product of the emulsion composition of claim 1, wherein the latex composition comprises polymeric latex particles.

10. The latex composition of claim 9, wherein the polymeric latex particles have a single glass transition temperature as determined using a Differential Scanning calorimeter.

11. The latex composition of claim 9, wherein the second (meth)acrylate polymer and a polymerized product of the first monomer composition are together in the same polymeric particles.

12. The latex composition of claim 9, further comprising a second tackifier that is water dispersible.

13. A pressure-sensitive adhesive comprising a dried product of the latex composition of claim 9.

14. An article comprising:
a) a substrate; and
b) a first pressure-sensitive adhesive layer positioned adjacent to a first major surface of the substrate, wherein the first pressure-sensitive adhesive layer comprises the pressure-sensitive adhesive of claim 13.

15. A method of forming a pressure-sensitive adhesive, the method comprising
a) forming an emulsion composition of claim 1;
b) polymerizing the emulsion composition to form a latex composition comprising polymeric latex particles; and
c) drying the latex composition to form the pressure-sensitive adhesive.

* * * * *